(12) United States Patent
Baron et al.

(10) Patent No.: US 10,684,739 B2
(45) Date of Patent: Jun. 16, 2020

(54) ATTENDANT CONTROL PANEL VIRTUAL TRAINER

(71) Applicant: THE BOEING COMPANY, Chicago, IL (US)

(72) Inventors: John P. Baron, Bothell, WA (US); Khashayar Borumand, Woodinville, WA (US); Severn T. Allen, Maple Valley, WA (US)

(73) Assignee: The Boeing Company, Chicago, IL (US)

( * ) Notice: Subject to any disclaimer, the term of this patent is extended or adjusted under 35 U.S.C. 154(b) by 308 days.

(21) Appl. No.: 13/957,284

(22) Filed: Aug. 1, 2013

(65) Prior Publication Data

US 2015/0040066 A1 Feb. 5, 2015

(51) Int. Cl.
*G06F 3/0482* (2013.01)
*G09B 9/16* (2006.01)

(52) U.S. Cl.
CPC ........... *G06F 3/0482* (2013.01); *G09B 9/165* (2013.01)

(58) Field of Classification Search
CPC ... G06F 3/0482; G06F 11/3013; G05B 23/02; H04L 63/0876; G09B 9/165
USPC ......................................................... 715/810
See application file for complete search history.

(56) References Cited

U.S. PATENT DOCUMENTS

| | | | |
|---|---|---|---|
| 7,020,335 B1* | 3/2006 | Abousleman | G06K 9/3241 375/240.11 |
| 2008/0087039 A1* | 4/2008 | Reed et al. | 62/498 |
| 2010/0094595 A1* | 4/2010 | Whittington | G09B 9/301 703/1 |
| 2011/0004832 A1* | 1/2011 | Canal | G06Q 30/06 715/758 |
| 2012/0022901 A1* | 1/2012 | Nasr | G06Q 10/02 705/5 |
| 2012/0078752 A1* | 3/2012 | Hultberg | G06Q 20/02 705/26.41 |

(Continued)

FOREIGN PATENT DOCUMENTS

| | | |
|---|---|---|
| JP | 2004-118383 | 4/2004 |
| WO | WO 2011/141702 | 11/2011 |

OTHER PUBLICATIONS

Extended European Search Report, Patent Application No. 14178890.1-1958, dated Jan. 9, 2015.

(Continued)

*Primary Examiner* — Jennifer N To
*Assistant Examiner* — Amy P Hoang
(74) *Attorney, Agent, or Firm* — Haynes and Boone LLP

(57) ABSTRACT

The present disclosure provides a system, method, and apparatus for a virtual trainer for a control panel for a vehicle. In one or more embodiments, the disclosed system comprises a device with a screen, where the virtual trainer is loaded onto the device, and the virtual trainer is to display, on the screen of the device, available selections relating to different functions for the vehicle, as shown on the control panel for the vehicle. In one or more embodiments, the vehicle is a multi-passenger vehicle. In at least one embodiment, the vehicle is an aircraft, a terrestrial vehicle, or a marine vehicle. In some embodiments, the device is mobile or stationary. In one or more embodiments, the device is a tablet device and/or the control panel itself. In at least one embodiment, the screen of the device is a touch screen.

20 Claims, 28 Drawing Sheets

(56) References Cited

U.S. PATENT DOCUMENTS

| | | | | |
|---|---|---|---|---|
| 2012/0308965 | A1* | 12/2012 | Andrews | G09B 9/08 |
| | | | | 434/30 |
| 2013/0046592 | A1* | 2/2013 | Ross | G06F 3/04815 |
| | | | | 705/14.4 |
| 2013/0144482 | A1* | 6/2013 | Tuukkanen | G06F 3/0482 |
| | | | | 701/29.6 |
| 2013/0218409 | A1* | 8/2013 | Blain | B64D 11/0015 |
| | | | | 701/36 |
| 2013/0314257 | A1* | 11/2013 | Macrae | G08C 17/00 |
| | | | | 340/971 |
| 2014/0063055 | A1* | 3/2014 | Osterhout et al. | 345/633 |
| 2014/0163771 | A1* | 6/2014 | Demeniuk | H04B 1/082 |
| | | | | 701/2 |

OTHER PUBLICATIONS

Dilorenzo, et al., "Android for Fighter Pilots: Replacing Paper with Tablet Technology", Jun. 2011, XP055159620, Retrieved from internet: http://urn.kb.se/resolve?urn=urn:nbn:se:uu:diva-155780, the whole document.

Koebbe, "Flying with the iPad", Jan. 17, 2013, Retrieved from internet: https://www.youtube.com/watch?v=AnWCraGvSHE, the whole document.

Bassanesi, et al., "Heads Up, Heads Down: The iPad and its use in the General Aviation Cockpit SFTY 320 Human Factors in Aviation Safety the Apple iPad as an Electronic Flight Bag", Nov. 2011, XP055159625, Retrieved from internet: http://www.aviationplatform.com/attachments/article/62/Bassanesi_Ipad.pdf, Retrieved on Dec. 19, 2011, the whole document.

\* cited by examiner

FIG. 26

Scene Preview

Scene Preview Summary

| | | |
|---|---|---|
| Cove | 31 | HIGH |
| Wash | 31 | HIGH |
| Sidewall | 31 | HIGH |
| Overwing | 31 | HIGH |
| Direct | W1 | HIGH |
| Crossbin | W1 | HIGH |
| COS | W1 | HIGH |
| Transition | 0 | |

Full Color Lights

| Cove | Wash | Sidewall | Overwing |
|---|---|---|---|
| 1 | 2 | 3 | 4 |
| 5 | 6 | 7 | 8 |
| 9 | 10 | 11 | 12 |
| 13 | 14 | 15 | 16 |
| 17 | 18 | 19 | 20 |
| 21 | 22 | 23 | 24 |
| 25 | 26 | 27 | 28 |
| 29 | 30 | 31 | 32 |

White/Amber Lights

Direct | Crossbin | COS
W1 | W2 | W3 | W4

Light Intensity

OFF | LOW | MED | HI

Scene Transition Time (0-30 seconds)

∨ 0 ∧

Control Window

Installed Scenes

∨ OFF ∧

Preview Scene | Exit

2600

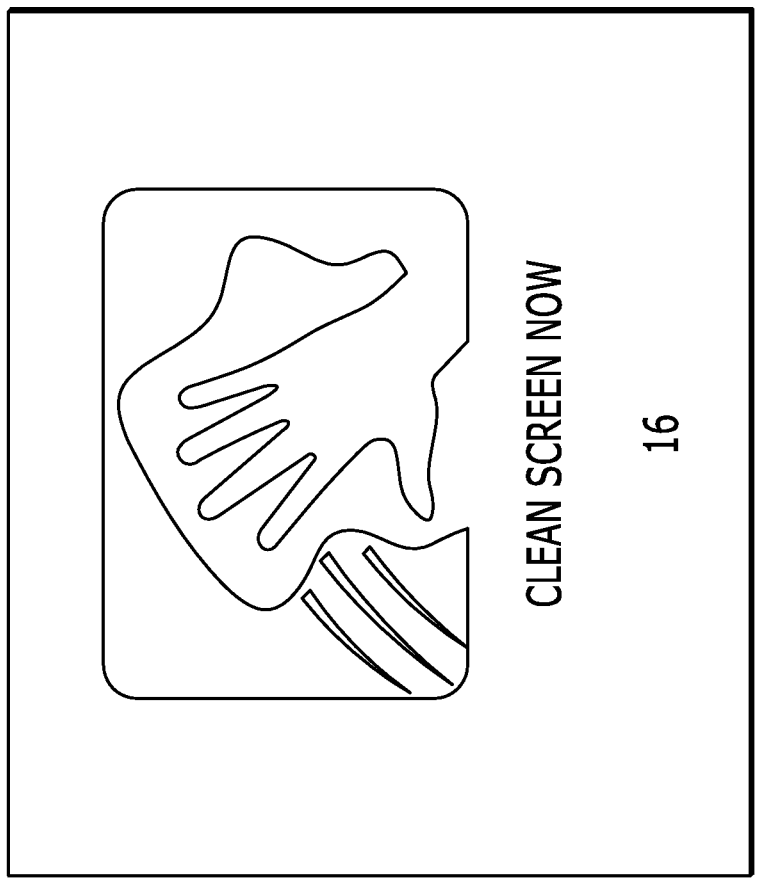

ATTENDANT CONTROL PANEL VIRTUAL TRAINER

BACKGROUND

The present disclosure relates to virtual trainers. In particular, it relates to attendant control panel (ACP) virtual trainers.

An ACP is a stationary touch screen control panel that is located within the cabin of certain models of aircrafts, and is used by flight attendants and aircraft mechanics to control and/or monitor various features of the aircraft. Because ACPs are software based, they can integrate and control multiple aircraft system features using a single touch screen control panel. The challenges for ACPs are being able to keep up with the training needs for ACPs because of the rapid evolution of technology, and managing data to allow for software upgrades to the ACPs. As such, there is a need for a solution that provides for increased access and mobility for training for ACPs and for managing data for ACP software upgrades.

SUMMARY

The present disclosure relates to a method, system, and apparatus for an attendant control panel (ACP) virtual trainer. The disclosed system for a virtual trainer for a control panel for a vehicle comprises a device with a screen; where the virtual trainer is loaded onto the device, and the virtual trainer displays, on the screen of the device, available selections relating to different functions for the vehicle, as shown on the control panel for the vehicle.

In at least one embodiment, when the virtual trainer is loaded onto the device, the virtual trainer recognizes a type of the vehicle the device is located in and displays the available selections relating to the different functions for the type of the vehicle, as shown on the control panel for the type of the vehicle.

In one or more embodiments, the vehicle is a multi-passenger vehicle. In some embodiments, the vehicle is an aircraft, a terrestrial vehicle, or a marine vehicle. In at least one embodiment, the aircraft is an airplane, a helicopter, or a space plane. In one or more embodiments, the terrestrial vehicle is a bus, a train, a car, a van, a truck, and a tank. In some embodiments, the marine vehicle is a boat, a ship, a tanker, or a submarine. In one or more embodiments, the vehicle may alternatively be a building or an industrial facility, such as an oil platform.

In at least one embodiment, the device is mobile or stationary. In one or more embodiments, the device is a tablet device and/or the control panel itself. In some embodiments, the screen of the device is a touch screen. In at least one embodiment, the control panel comprises a touch screen.

In one or more embodiments, the available selections are feature categories, features, and/or feature selections. In some embodiments, the feature categories are lighting, passenger services, environment, maintenance, and/or special functions. In at least one embodiment, the features for the lighting feature category are boarding/deplane, take-off/landing, cruise, night/sleep, meal/beverage, sunrise/sunset, white bright, white medium, off, and/or custom scenes. In one or more embodiments, the features for the passenger services feature category are in-flight entertainment, personal computer power ports, cabin cell phones, and/or cabin ready. In some embodiments, the features for the environment feature category are potable water quantities, vacuum waste quantities, aft cabin temperature control, aft cabin smoke detectors, forward cabin temperature control, and/or forward cabin smoke detectors. In at least one embodiment, the features for the maintenance feature category are at configuration check, system test, data load, fault data, lighting check, vacuum waste, and/or scene preview. In one or more embodiments, the features for the special functions feature category are in-flight entertainment power, cabin Wi-Fi power, and/or cabin personal electronic device (PED) (e.g., iPad) charging station power. In some embodiments, the virtual trainer is a web-based application.

In one or more embodiments, the disclosed method for a virtual trainer for a control panel of a vehicle involves displaying, by the virtual trainer, on a screen of a device, available selections relating to different functions for the vehicle, as shown on the control panel for the vehicle. In some embodiments, the method further involves loading the virtual trainer onto the device.

The features, functions, and advantages can be achieved independently in various embodiments of the present inventions or may be combined in yet other embodiments.

DRAWINGS

These and other features, aspects, and advantages of the present disclosure will become better understood with regard to the following description, appended claims, and accompanying drawings where:

FIG. 26 is a screen shot for the maintenance feature category of the disclosed ACP virtual trainer showing exemplary scene preview selections made for the scene preview feature, in accordance with at least one embodiment of the present disclosure.

FIG. 28 is a screen shot from the disclosed ACP virtual trainer showing a clean screen now image, in accordance with at least one embodiment of the present disclosure.

DESCRIPTION

Figure 1:
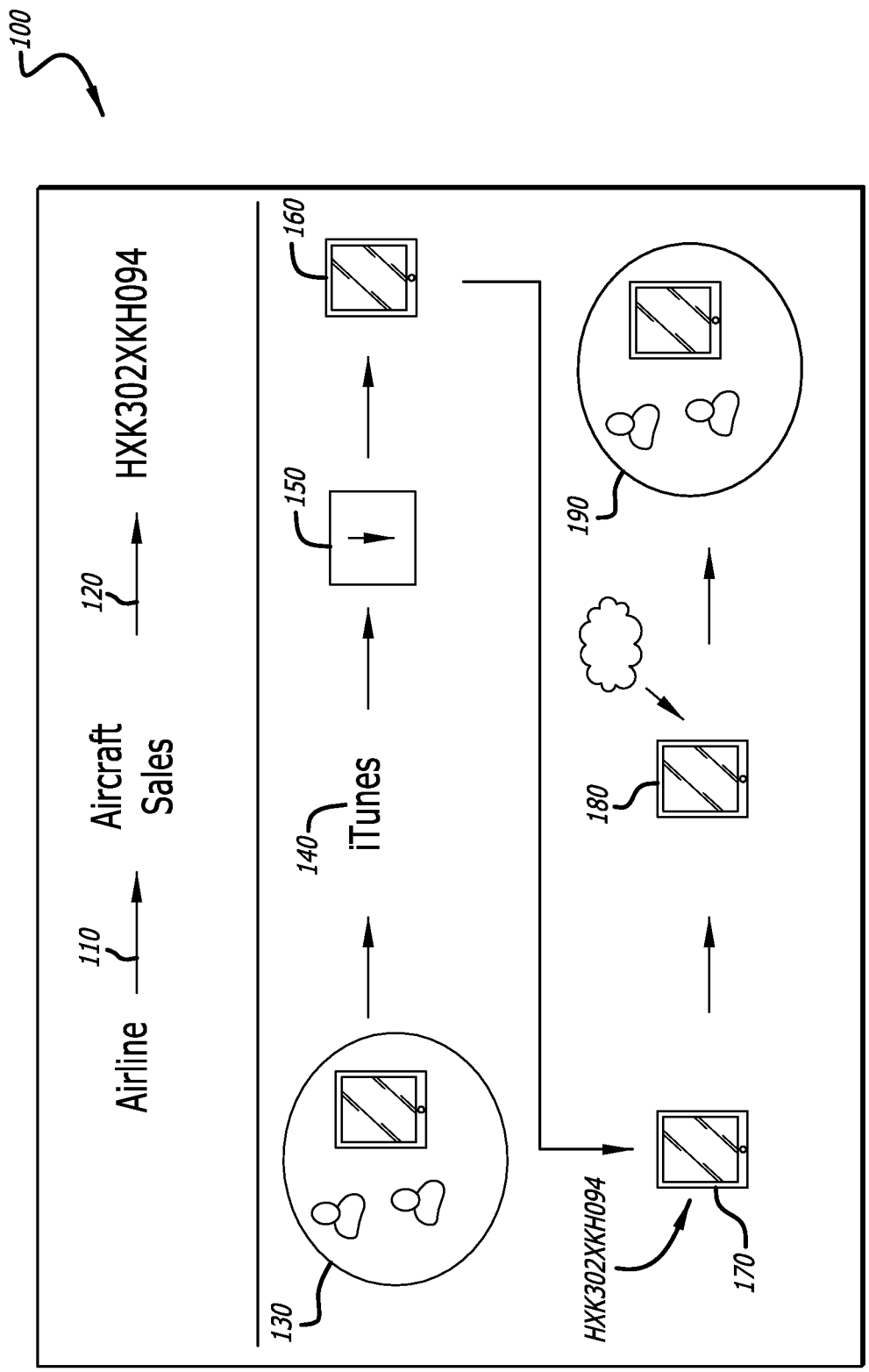
FIG. 1 is a schematic flow diagram illustrating the disclosed method for downloading the disclosed attendant control panel (ACP) virtual trainer onto a mobile device, in accordance with at least one embodiment of the present disclosure.

The methods and apparatus disclosed herein provide an operative system for an attendant control panel (ACP) virtual trainer. Specifically, the disclosed ACP virtual trainer is an interactive software training application that is run on a mobile device. The ACP virtual trainer is used to meet training and familiarization needs of airline flight attendants and aircraft mechanics for an ACP on an aircraft. An ACP is a stationary touch screen control panel that is located within the cabin of certain models of aircrafts, and is used by flight attendants and aircraft mechanics to control and/or monitor various features of the aircraft. Various features of the aircraft that are monitored and/or controlled by the ACP include, but are not limited to, cabin lighting, cabin temperature, in-flight entertainment, cabin personal computer power ports, cabin cellular phones, potable water quantities, vacuum waste quantities, lavatory smoke detectors, in-flight entertainment server power, cabin Wi-Fi power, and cabin personal electronic device (PED) (e.g., an iPad) charging station power.

As ACPs incorporate newer technologies, such as revised touch screens, end users will undergo training for the new features. Many airlines have flight crews that work on large fleets of various aircraft models. Flight crew interaction with the touch screen ACPs may happen occasionally for these flight crews, so there is a need to provide quick familiarization to flight crews of the latest touch screen ACPs. A quick and easy mobile application meets that need better than compact discs-read only memory (CD ROMs) or personal computer (PC) based applications. Because ACPs are moving to a software-based system that incorporates multiple applications that were previously on separate systems, there is a use for continuous learning to keep up with the advantages of a flexible architecture as ACPs evolve.

The intent is that after the ACP virtual trainer is downloaded onto a mobile device, the device would be used by end users as a learning tool. The device would also be available to other organizations, such as design engineers, trainers, configuration specialists, delivery/field support, and marketing and sales organizations to be used as a tool for easy demonstration of how the ACP on an aircraft works by incorporating touch screen technology with a touch screen display. The ACP virtual trainer may also be used to provide interactive touch screens to show end users the latest software updates and features of the ACP. Major benefits of the ACP virtual trainer are interactive training, mobility, and the ease of updating the application through proven application update methodologies as a push of data to the end users. In some embodiments, the ACP virtual trainer could be used for trouble shooting, and used to provide a quick layout out or prototype for "proof of concept" demonstrations of the ACP to aircraft customers. An ACP virtual trainer utilizing web-based applications has the benefit of providing an easily assessable training application for in-classroom training and familiarization of current and planned incorporation of further ACP features. An added benefit of the ACP virtual trainer utilizing web-based applications is that it can be installed within an aircraft's onboard network server to provide on-aircraft familiarization training.

The ACP virtual trainer provides easy access to interactive training for aircraft factory, field, and aircraft customers. Specifically, the ACP virtual trainer may be made available to end users, factory installers, field support at the aircraft manufacturer, the airline pilots, flight attendants, airline mechanics, as well as companies or organizations at maintenance, repair, and operations (MRO) facilities. The ACP virtual trainer provides a platform to organizations to train their workers to become familiar with the features and functions of the ACPs. The ACP virtual trainer will help to save time and money associated with training and troubleshooting of ACPs, and will provide cost avoidance for issues with regard to training during troubleshooting and installation of ACPs at times of assembly, software load, and delivery. In addition, the ACP virtual trainer will help to provide for "service readiness" for aircraft customers, with regard to aircraft training and maintenance.

In at least one embodiment, the disclosed ACP virtual trainer allows for the user to interact with a tablet (e.g., an Apple iPad) to simulate the functionality of the aircraft ACP. In particular, the ACP virtual trainer provides simulation screens for five specific ACP feature categories, which are (1) lighting, (2) passenger services, (3) environment, (4) maintenance, and (5) special functions. For example, the user can use the ACP virtual trainer to select the lighting feature category and to run a quick simulation to review the touch screen function buttons that allow for the user to be able to select certain lighting features for the cabin. Once the user selects the applicable touch screen button(s) for particular lighting features, the ACP virtual trainer will display a visual example of how the selected lighting configuration will appear within the cabin. In addition, the user can use the ACP virtual trainer to select other touch screen buttons to quickly review the interactivity of the different cabin lighting features. Different cabin lighting features may include, but are not limited to, boarding/deplane lighting, take off/ landing lighting, cruise lighting, night/sleep lighting, meal/ beverage lighting, sunrise/sunset lighting, white bright lighting, white medium lighting, and off lighting.

In one or more embodiments, in the non-interactive environment, the user can use the ACP virtual trainer to select a feature category or touch screen button for a quick explanation of the functionality that pertains to that specific selection. For example, a highlight (e.g., a light grey box) will appear over a feature category or touch screen button. When the user selects a feature category or touch screen button while it has a highlight present, a pop-up window will appear on the screen containing an explanation of the functionality of that specific selection.

It should be noted that in alternative embodiments, the ACP virtual trainer may be downloaded onto different types of devices other than a tablet. Various types of devices that the ACP virtual trainer may be downloaded onto include, but are not limited to, a laptop computer, a desktop computer, a smart phone (e.g., an iPhone), and the ACP itself, which is installed on-board the vehicle (e.g., the aircraft).

In the following description, numerous details are set forth in order to provide a more thorough description of the system. It will be apparent, however, to one skilled in the art, that the disclosed system may be practiced without these specific details. In the other instances, well known features have not been described in detail so as not to unnecessarily obscure the system.

FIG. 1 is a schematic flow diagram 100 illustrating the disclosed method for downloading the disclosed attendant control panel (ACP) virtual trainer onto a mobile device, in accordance with at least one embodiment of the present disclosure. In this figure, at the start of the method, an airline (i.e. an aircraft customer) makes a software license order (SLO) with the aircraft manufacturer 110. In response, the aircraft manufacturer provides at least one activation code (e.g., HXK302XKH094) to the aircraft customer 120. The aircraft customer provides devices (e.g., a tablet device), which are to be used for the virtual trainer, to virtual trainer users 130. At least one user then logs into an application store (e.g., an iTunes store) 140. Then, the user(s) downloads 150 the virtual trainer application onto their device 160. The user(s) then opens the virtual trainer application by entering the activation code(s) that was received from the aircraft manufacturer (or, alternatively, the user(s) enters their MBF credentials) 170. Then, the user(s) downloads the virtual trainer application onto the device 180. Once the virtual trainer is loaded onto the device, the virtual trainer is ready to be used by the user(s) 190.

In some embodiments, when the virtual trainer is loaded onto the device, the ACP virtual trainer recognizes the type of the vehicle (e.g., a Boeing 777 aircraft) the device is located within. Then, the ACP virtual trainer displays on the device the available selections relating to the different functions for the type of the vehicle, as would be shown on the control panel for that particular type of the vehicle. (e.g., the ACP virtual trainer displays on the device the available selections as would be shown on the ACP housed within a Boeing 777 aircraft).

Figure 2:
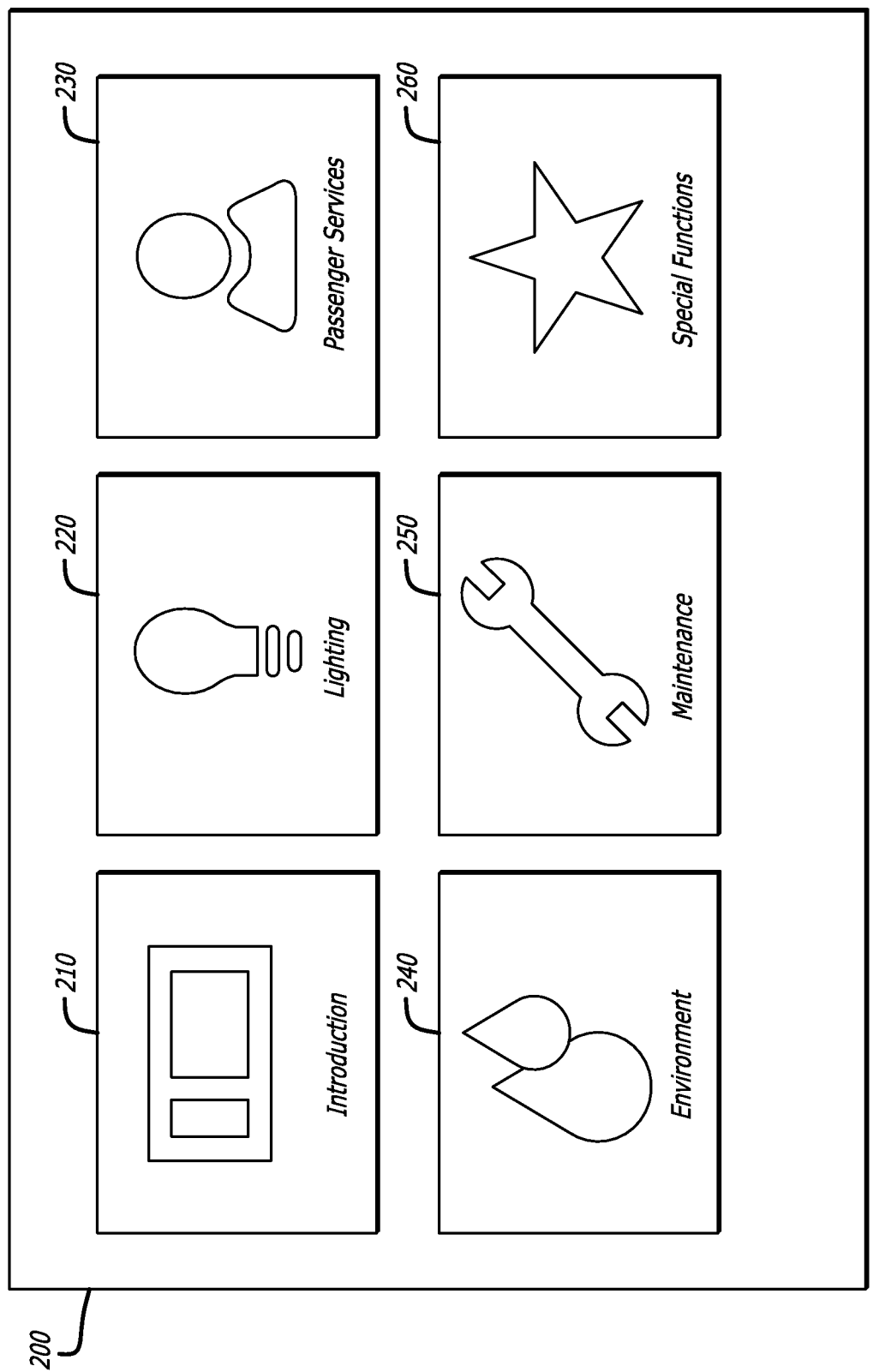
FIG. 2 is a screen shot of the main screen from the disclosed ACP virtual trainer showing exemplary feature categories, in accordance with at least one embodiment of the present disclosure.

FIG. 2 is a screen shot of the main screen 200 from the disclosed ACP virtual trainer showing exemplary feature categories 210-260, in accordance with at least one embodiment of the present disclosure. In this figure, the feature categories are shown to include introduction 210, lighting 220, passenger services 230, environment 240, maintenance 250, and special functions 260. When the introduction category 210 is selected, which may be done via touch when the device includes a touch screen (or, alternatively, by a mouse if the device does not include a touch screen), a brief introduction describing how to operate the virtual trainer will be displayed on the screen of the device. When any of the other feature categories 220-260 are selected by the user, different screens associated with the selected feature category will be displayed on the screen of the device. These various screens will be shown and described in detail for the following figures.

Figure 3:
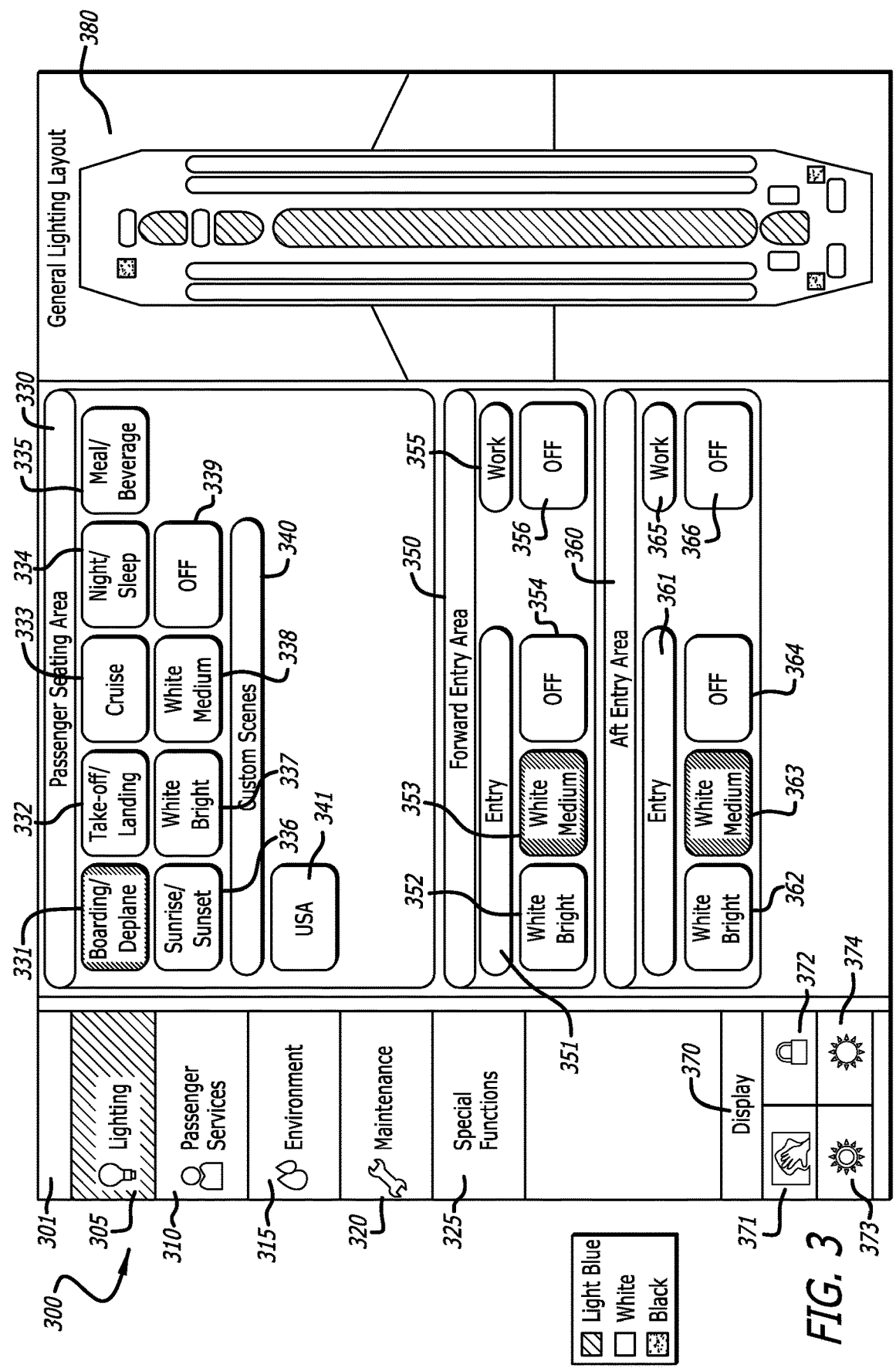
FIG. 3 is a screen shot for the lighting feature category of the disclosed ACP virtual trainer showing exemplary lighting selections made for the boarding/deplane cabin lighting feature, in accordance with at least one embodiment of the present disclosure.

FIG. 3 is a screen shot 300 for the lighting feature category 305 of the disclosed ACP virtual trainer showing exemplary lighting selections made for the boarding/deplane cabin lighting feature 331, in accordance with at least one embodiment of the present disclosure. The left-hand margin of the screen shot 300 contains two sections, which are the feature category section 301 and the display section 370. The feature category section 301 is shown to comprise the lighting feature category 305, the passenger services feature category 310, the environment feature category 315, the maintenance feature category 320, and the special functions feature category 325. Details of the specific screen shots for each the different feature categories will be discussed when describing the following figures.

The display section 370 of the screen shot 300 is shown to include a clean screen button 371, a lock button 372, a dim screen button 373, and a brighter screen button 374. When the clean screen button 371 is selected, a clean screen now image will be displayed (refer to FIG. 28), and the touch sensitivity of the touch screen will be disengaged for a short period of time to allow for the user to clean the touch screen. When the period of time has elapsed, the sensitivity of the touch screen will be re-established, and the clean screen now image will disappear. If the user selects the lock button 372, the touch screen will transition to a screen saver image. When the aircraft is on the ground, the touch screen image is a logo. When the airplane is in the air, the touch screen is black and displays no image. The dim screen button 373, if selected, will simply lower the illumination of virtual trainer screens on the display of the device. And, conversely, the brighter screen button 374, if selected, will simply increase the illumination of the virtual trainer screens on the display of the device.

In this figure, it is shown that the lighting feature category 305 has been selected by the user. The screen shot 300 shows that the lighting feature category 305 comprises five sections. These five sections are the passenger seating area section 330, the custom scenes section 340, the forward entry area section 350, the aft entry area section 360, and the general lighting layout section 380.

The passenger seating area section 330 is shown to include nine features. The nine features are boarding/deplane 331, take-off/landing 332, cruise 333, night/sleep 334, meal/beverage 335, sunrise/sunset 336, white bright 337, white medium 338, and off 339. The customs scenes section 340 is shown to include one feature, which is USA 341.

The forward entry area section 350 is shown to include two features, which are entry 351 and work 355. The entry feature 351 is shown to include three button selections, which are white bright 352, white medium 353, and on/off 354. The work feature is shown to include one button selection, which is on/off 356.

Similar to the forward entry area section 350, the aft entry area section 360 is shown to include two features, which are entry 361 and work 365. The entry feature 361 is shown to include three button selections, which are white bright 362, white medium 363, and on/off 364. The work feature is shown to include one button selection, which is on/off 366.

The general lighting layout section 380 is shown to include a depiction of the different lights that are located within the aircraft cabin. When certain lighting features are selected by the user, the general lighting layout section 380 will display the selected lighting configuration as it would appear within the aircraft.

In particular, in FIG. 3, it is shown that the user has selected the lighting feature category 305 as well as the boarding/deplane feature 331 for the passenger seating area section 330, the white medium button selection 353 for the entry feature 351 for the forward entry area section 350, and the white medium button selection 363 for the entry feature 361 for the aft entry area section 360. The general lighting layout section 380 is shown to display the specific lighting configuration, which corresponds to these specific lighting selections, as it would appear in the cabin of the aircraft.

Figure 4:
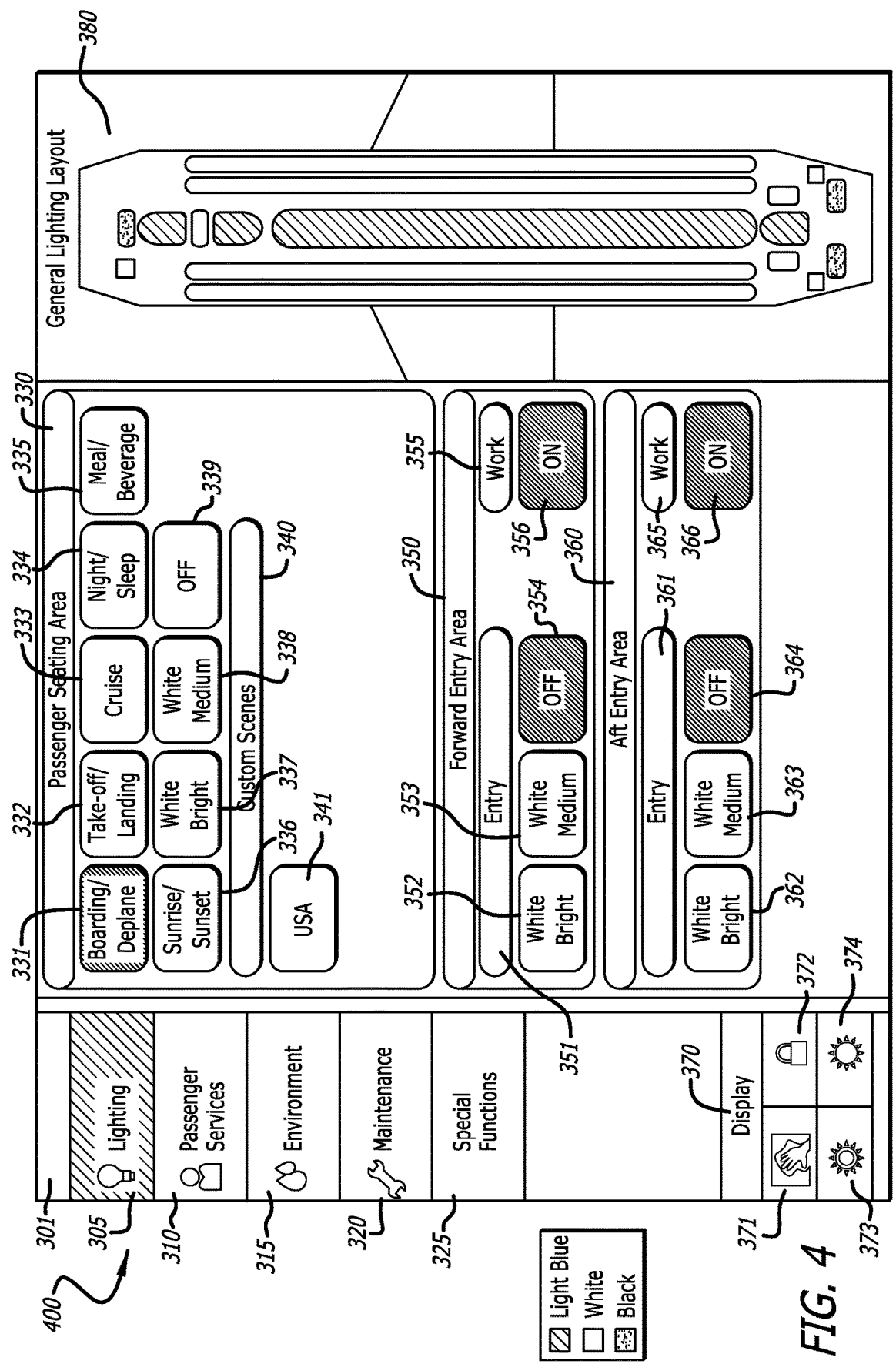
FIG. 4 is a screen shot for the lighting feature category of the disclosed ACP virtual trainer showing different exemplary lighting selections made for the boarding/deplane cabin lighting feature, in accordance with at least one embodiment of the present disclosure.

FIG. 4 is a screen shot 400 for the lighting feature category 305 of the disclosed ACP virtual trainer showing different exemplary lighting selections made for the boarding/deplane cabin lighting feature 331, in accordance with at least one embodiment of the present disclosure. In this figure, it is shown that the user has selected the lighting feature category 305 as well as the boarding/deplane feature 331 for the passenger seating area section 330, the off selection 354 for the entry feature 351 for the forward entry area section 350, the off button selection 364 for the entry feature 361 for the aft entry area section 360, the on button selection 356 for the work feature 355 for the forward entry area section 350, and the on button selection 366 for the work feature 365 for the aft entry area section 360. The general lighting layout section 380 is shown to display the specific lighting configuration, which corresponds to these specific lighting selections, as it would appear in the cabin of the aircraft.

Figure 5:
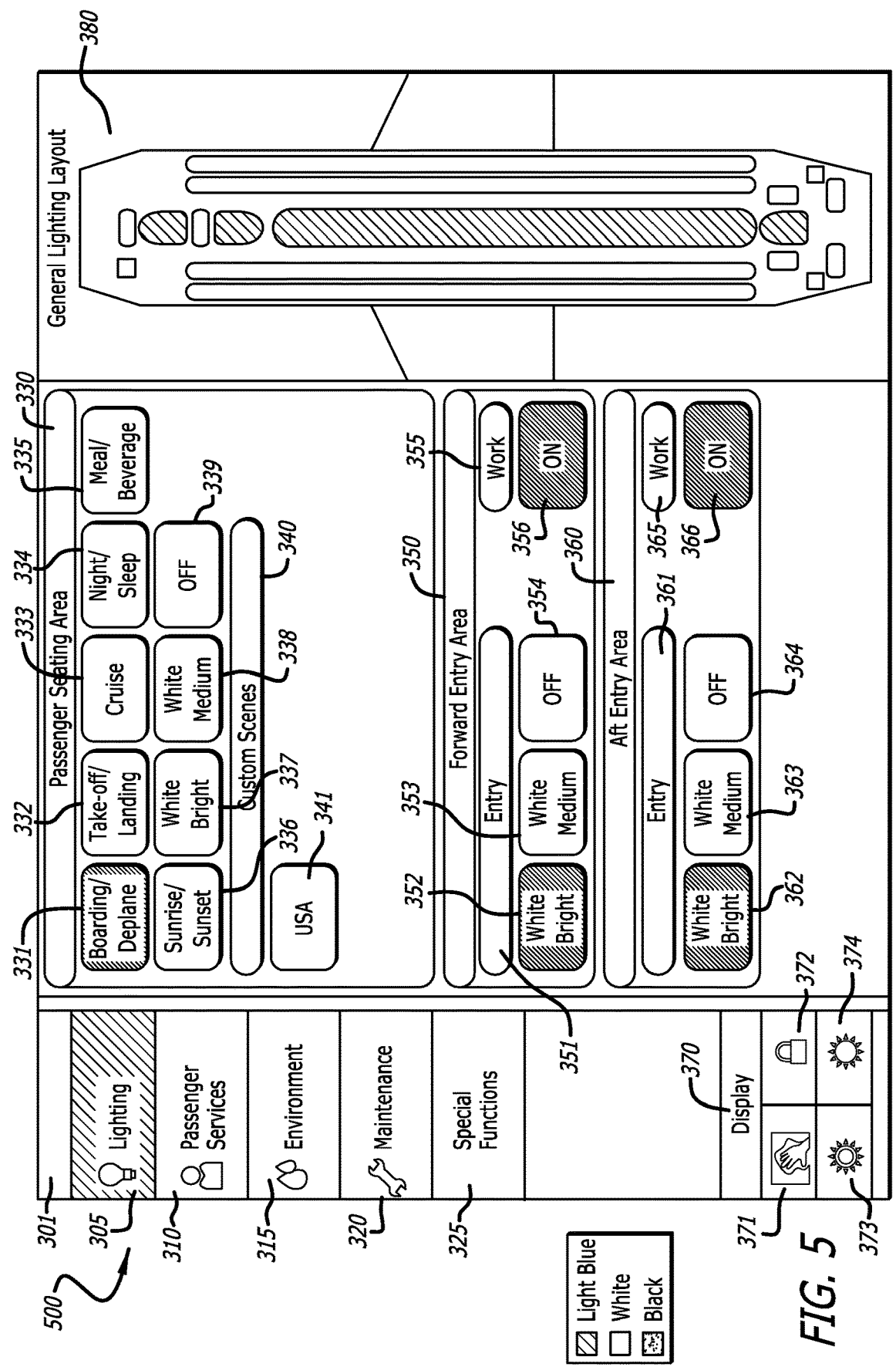
FIG. 5 is a screen shot for the lighting feature category of the disclosed ACP virtual trainer showing other exemplary lighting selections made for the boarding/deplane cabin lighting feature, in accordance with at least one embodiment of the present disclosure.

FIG. 5 is a screen shot 500 for the lighting feature category 305 of the disclosed ACP virtual trainer showing other exemplary lighting selections made for the boarding/deplane cabin lighting feature 331, in accordance with at least one embodiment of the present disclosure. In this figure, it is shown that the user has selected the lighting feature category 305 as well as the boarding/deplane feature 331 for the passenger seating area section 330, the white bright selection 352 for the entry feature 351 for the forward entry area section 350, the white bright button selection 362 for the entry feature 361 for the aft entry area section 360, the on button selection 356 for the work feature 355 for the forward entry area section 350, and the on button selection 366 for the work feature 365 for the aft entry area section 360. The general lighting layout section 380 is shown to display the specific lighting configuration, which corresponds to these specific lighting selections, as it would appear in the cabin of the aircraft.

Figure 6:
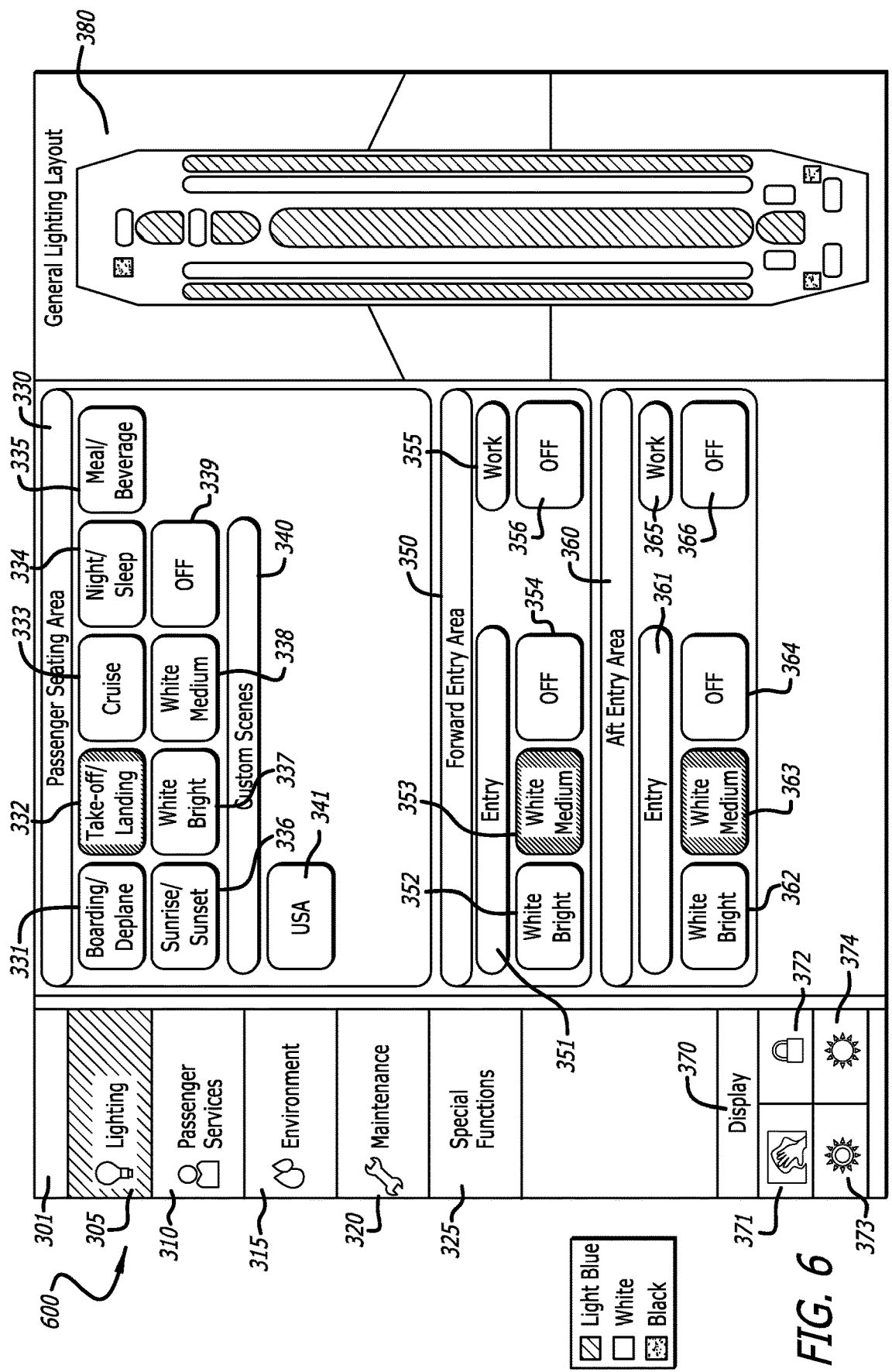
FIG. 6 is a screen shot for the lighting feature category of the disclosed ACP virtual trainer showing exemplary lighting selections made for the take-off/landing cabin lighting feature, in accordance with at least one embodiment of the present disclosure.

FIG. 6 is a screen shot 600 for the lighting feature category 305 of the disclosed ACP virtual trainer showing exemplary lighting selections made for the take-off/landing cabin lighting feature 332, in accordance with at least one embodiment of the present disclosure. In this figure, it is shown that the user has selected the lighting feature category 305 as well as the take-off/landing feature 332 for the passenger seating area section 330, the white medium selection 353 for the entry feature 351 for the forward entry area section 350, and the white medium button selection 363 for the entry feature 361 for the aft entry area section 360. The general lighting layout section 380 is shown to display the specific lighting configuration, which corresponds to these specific lighting selections, as it would appear in the cabin of the aircraft.

Figure 7:
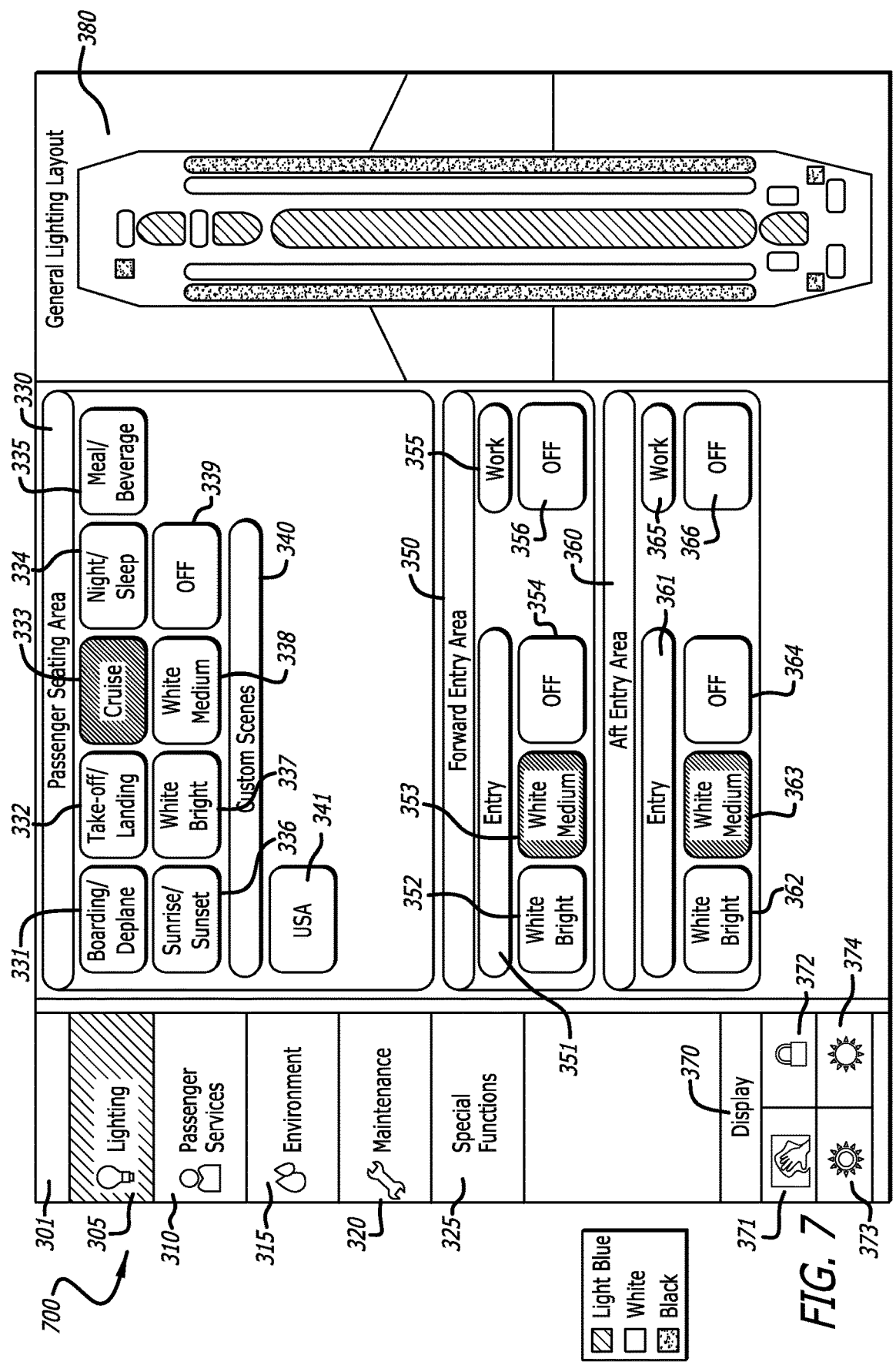
FIG. 7 is a screen shot for the lighting feature category of the disclosed ACP virtual trainer showing exemplary lighting selections made for the cruise cabin lighting feature, in accordance with at least one embodiment of the present disclosure.

FIG. 7 is a screen shot 700 for the lighting feature category of the disclosed ACP virtual trainer showing exemplary lighting selections made for the cruise cabin lighting feature 333, in accordance with at least one embodiment of the present disclosure. In this figure, it is shown that the user has selected the lighting feature category 305 as well as the cruise feature 333 for the passenger seating area section 330, the white medium selection 353 for the entry feature 351 for the forward entry area section 350, and the white medium button selection 363 for the entry feature 361 for the aft entry area section 360. The general lighting layout section 380 is shown to display the specific lighting configuration, which corresponds to these specific lighting selections, as it would appear in the cabin of the aircraft.

Figure 8:
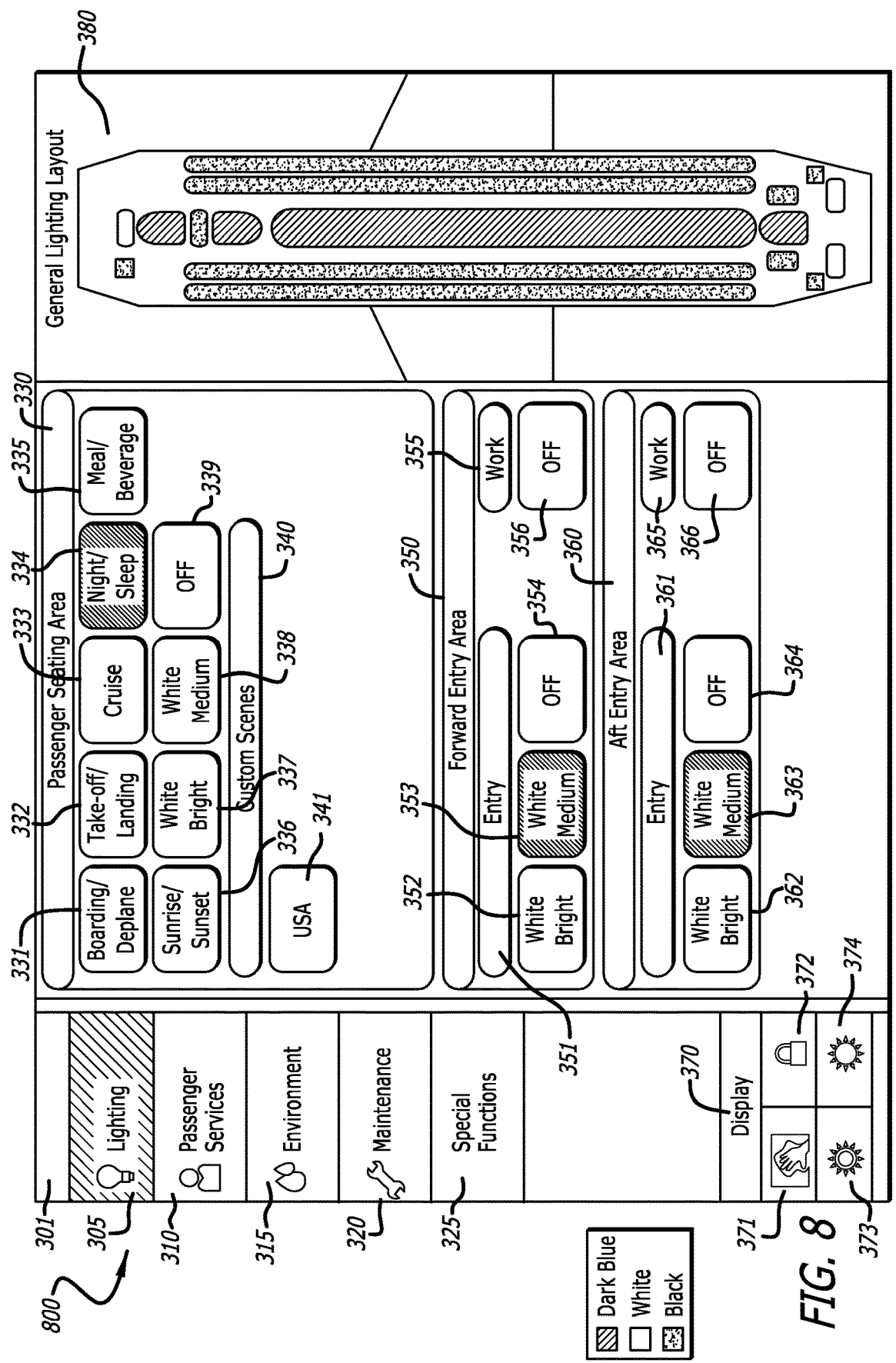
FIG. 8 is a screen shot for the lighting feature category of the disclosed ACP virtual trainer showing exemplary lighting selections made for the night/sleep cabin lighting feature, in accordance with at least one embodiment of the present disclosure.

FIG. 8 is a screen shot 800 for the lighting feature category of the disclosed ACP virtual trainer showing exemplary lighting selections made for the night/sleep cabin lighting feature 334, in accordance with at least one embodiment of the present disclosure. In this figure, it is shown that the user has selected the lighting feature category 305 as well as the night/sleep feature 334 for the passenger seating area section 330, the white medium selection 353 for the entry feature 351 for the forward entry area section 350, and the white medium button selection 363 for the entry feature 361 for the aft entry area section 360. The general lighting layout section 380 is shown to display the specific lighting configuration, which corresponds to these specific lighting selections, as it would appear in the cabin of the aircraft.

Figure 9:
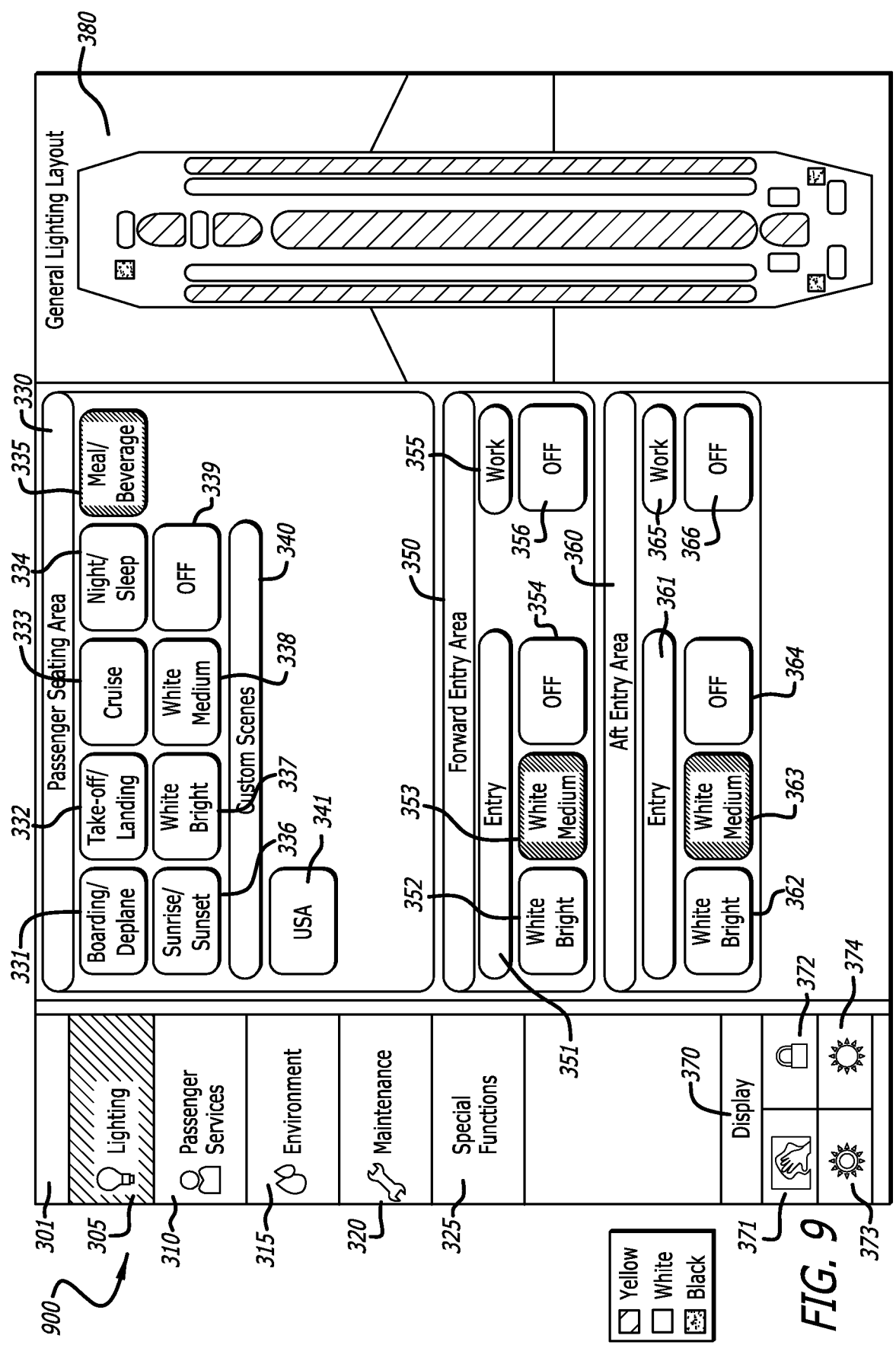
FIG. 9 is a screen shot for the lighting feature category of the disclosed ACP virtual trainer showing exemplary lighting selections made for the meal/beverage cabin lighting feature, in accordance with at least one embodiment of the present disclosure.

FIG. 9 is a screen shot 900 for the lighting feature category of the disclosed ACP virtual trainer showing exemplary lighting selections made for the meal/beverage cabin lighting feature 335, in accordance with at least one embodiment of the present disclosure. In this figure, it is shown that the user has selected the lighting feature category 305 as well as the meal/beverage feature 335 for the passenger seating area section 330, the white medium selection 353 for the entry feature 351 for the forward entry area section 350, and the white medium button selection 363 for the entry feature 361 for the aft entry area section 360. The general lighting layout section 380 is shown to display the specific lighting configuration, which corresponds to these specific lighting selections, as it would appear in the cabin of the aircraft.

Figure 10:
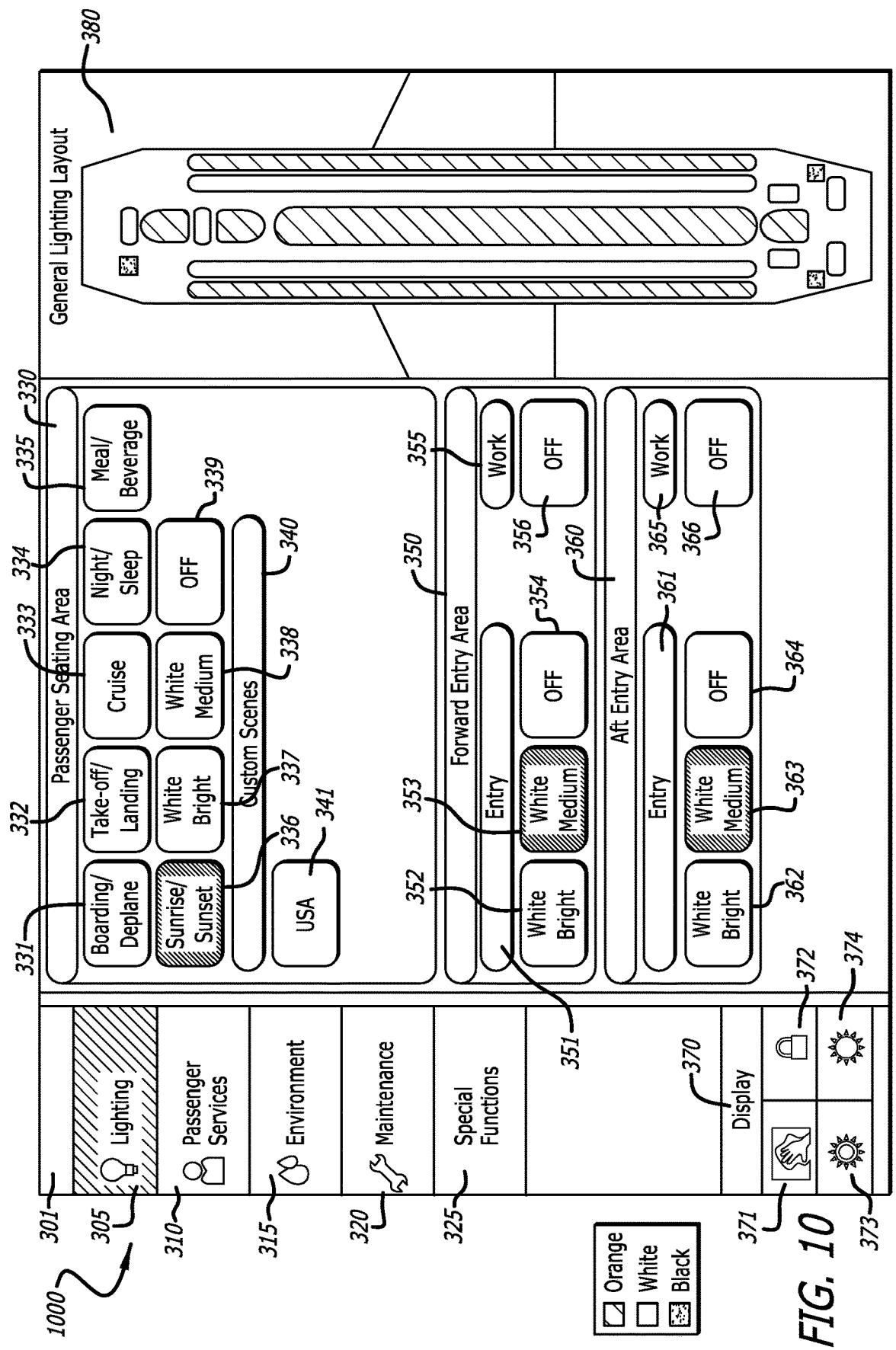
FIG. 10 is a screen shot for the lighting feature category of the disclosed ACP virtual trainer showing exemplary lighting selections made for the sunrise/sunset cabin lighting feature, in accordance with at least one embodiment of the present disclosure.

FIG. 10 is a screen shot 1000 for the lighting feature category of the disclosed ACP virtual trainer showing exemplary lighting selections made for the sunrise/sunset cabin lighting feature 336, in accordance with at least one embodiment of the present disclosure. In this figure, it is shown that the user has selected the lighting feature category 305 as well as the sunrise/sunset feature 336 for the passenger seating area section 330, the white medium selection 353 for the entry feature 351 for the forward entry area section 350, and the white medium button selection 363 for the entry feature 361 for the aft entry area section 360. The general lighting layout section 380 is shown to display the specific lighting configuration, which corresponds to these specific lighting selections, as it would appear in the cabin of the aircraft.

Figure 11:
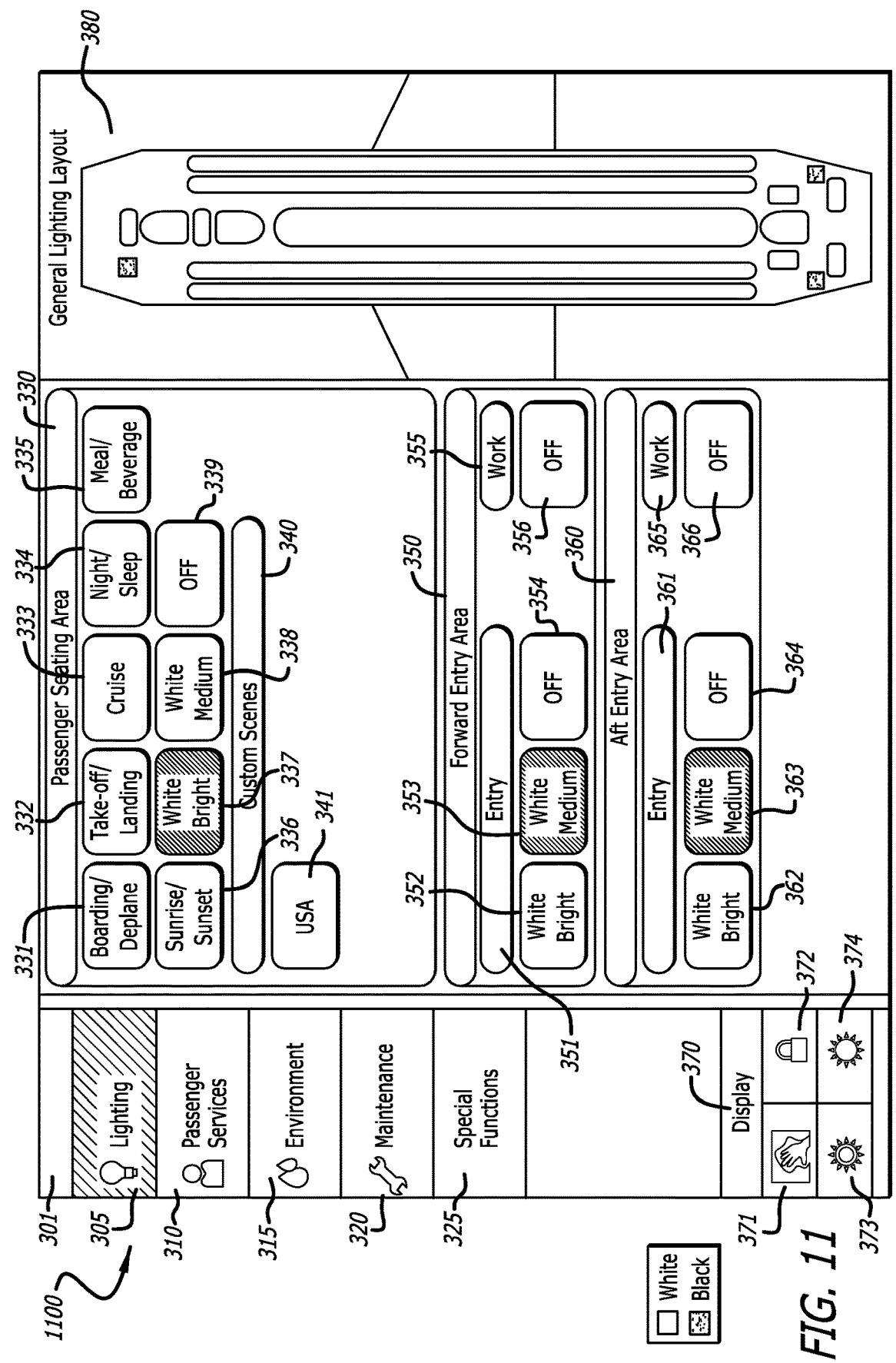
FIG. 11 is a screen shot for the lighting feature category of the disclosed ACP virtual trainer showing exemplary lighting selections made for the white bright cabin lighting feature, in accordance with at least one embodiment of the present disclosure.

FIG. 11 is a screen shot 1100 for the lighting feature category of the disclosed ACP virtual trainer showing exemplary lighting selections made for the white bright cabin lighting feature 337, in accordance with at least one embodiment of the present disclosure. In this figure, it is shown that the user has selected the lighting feature category 305 as well as the white bright feature 337 for the passenger seating area section 330, the white medium selection 353 for the entry feature 351 for the forward entry area section 350, and the white medium button selection 363 for the entry feature 361 for the aft entry area section 360. The general lighting layout section 380 is shown to display the specific lighting configuration, which corresponds to these specific lighting selections, as it would appear in the cabin of the aircraft.

Figure 12:
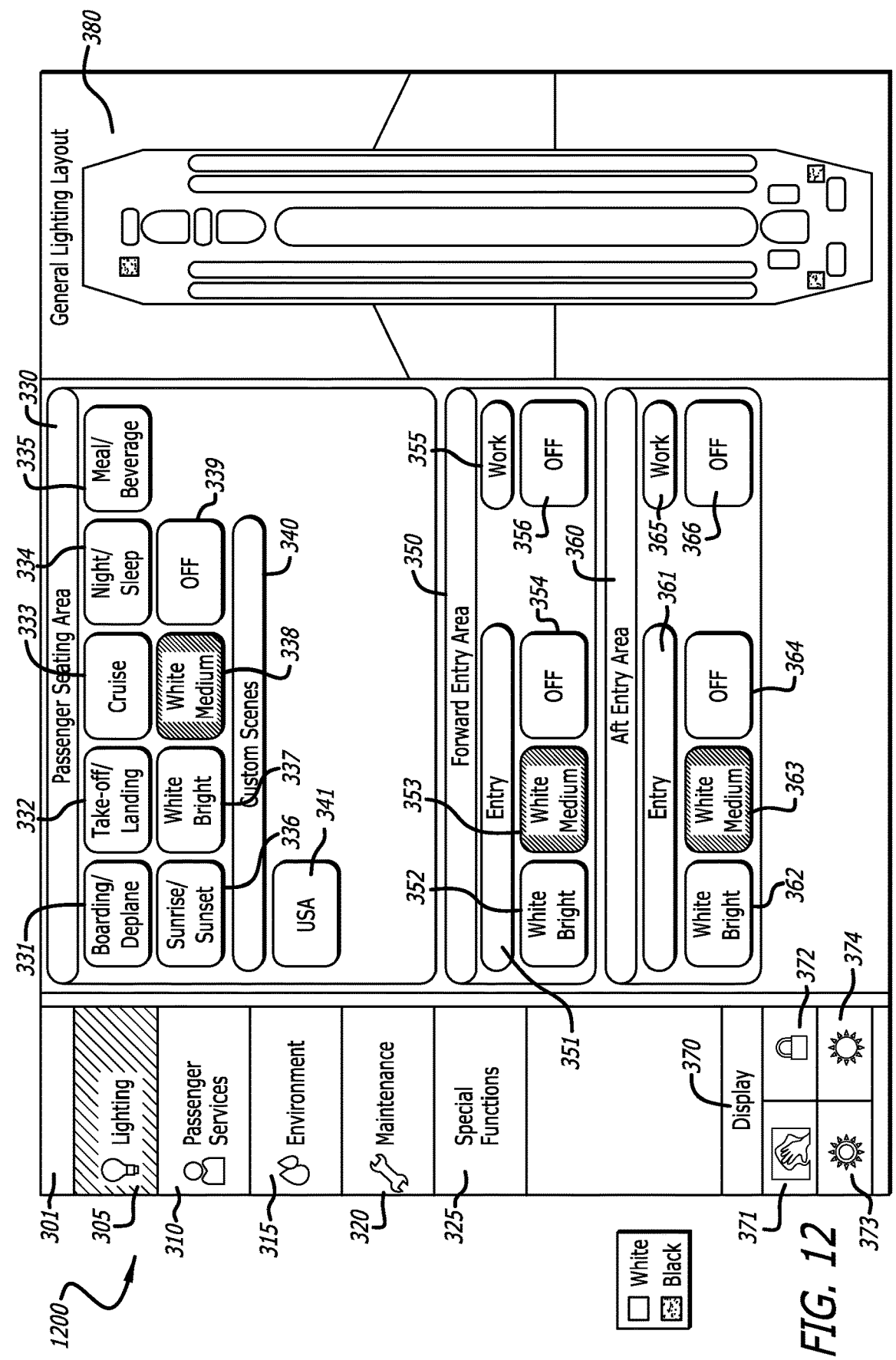
FIG. 12 is a screen shot for the lighting feature category of the disclosed ACP virtual trainer showing exemplary lighting selections made for the white medium cabin lighting feature, in accordance with at least one embodiment of the present disclosure.

FIG. 12 is a screen shot 1200 for the lighting feature category of the disclosed ACP virtual trainer showing exemplary lighting selections made for the white medium cabin lighting feature 338, in accordance with at least one embodiment of the present disclosure. In this figure, it is shown that the user has selected the lighting feature category 305 as well as the white medium feature 338 for the passenger seating area section 330, the white medium selection 353 for the entry feature 351 for the forward entry area section 350, and the white medium button selection 363 for the entry feature 361 for the aft entry area section 360. The general lighting layout section 380 is shown to display the specific lighting configuration, which corresponds to these specific lighting selections, as it would appear in the cabin of the aircraft.

Figure 13:
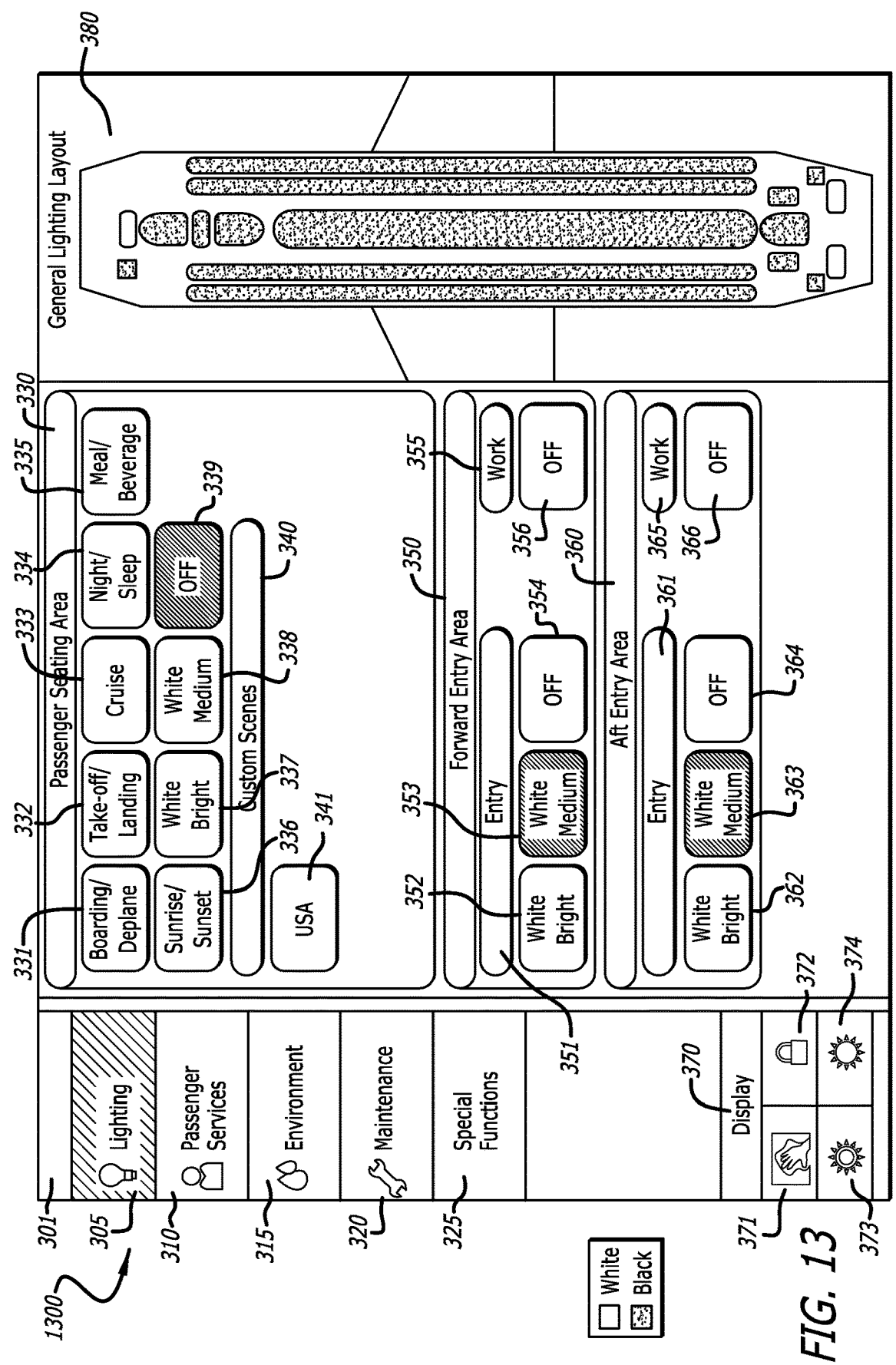
FIG. 13 is a screen shot for the lighting feature category of the disclosed ACP virtual trainer showing the off cabin lighting feature, in accordance with at least one embodiment of the present disclosure.

FIG. 13 is a screen shot 1300 for the lighting feature category of the disclosed ACP virtual trainer showing the off cabin lighting feature 339, in accordance with at least one embodiment of the present disclosure. In this figure, it is shown that the user has selected the lighting feature category 305 as well as the off feature 339 for the passenger seating area section 330, the white medium selection 353 for the entry feature 351 for the forward entry area section 350, and the white medium button selection 363 for the entry feature 361 for the aft entry area section 360. The general lighting layout section 380 is shown to display the specific lighting configuration, which corresponds to these specific lighting selections, as it would appear in the cabin of the aircraft.

Figure 14:
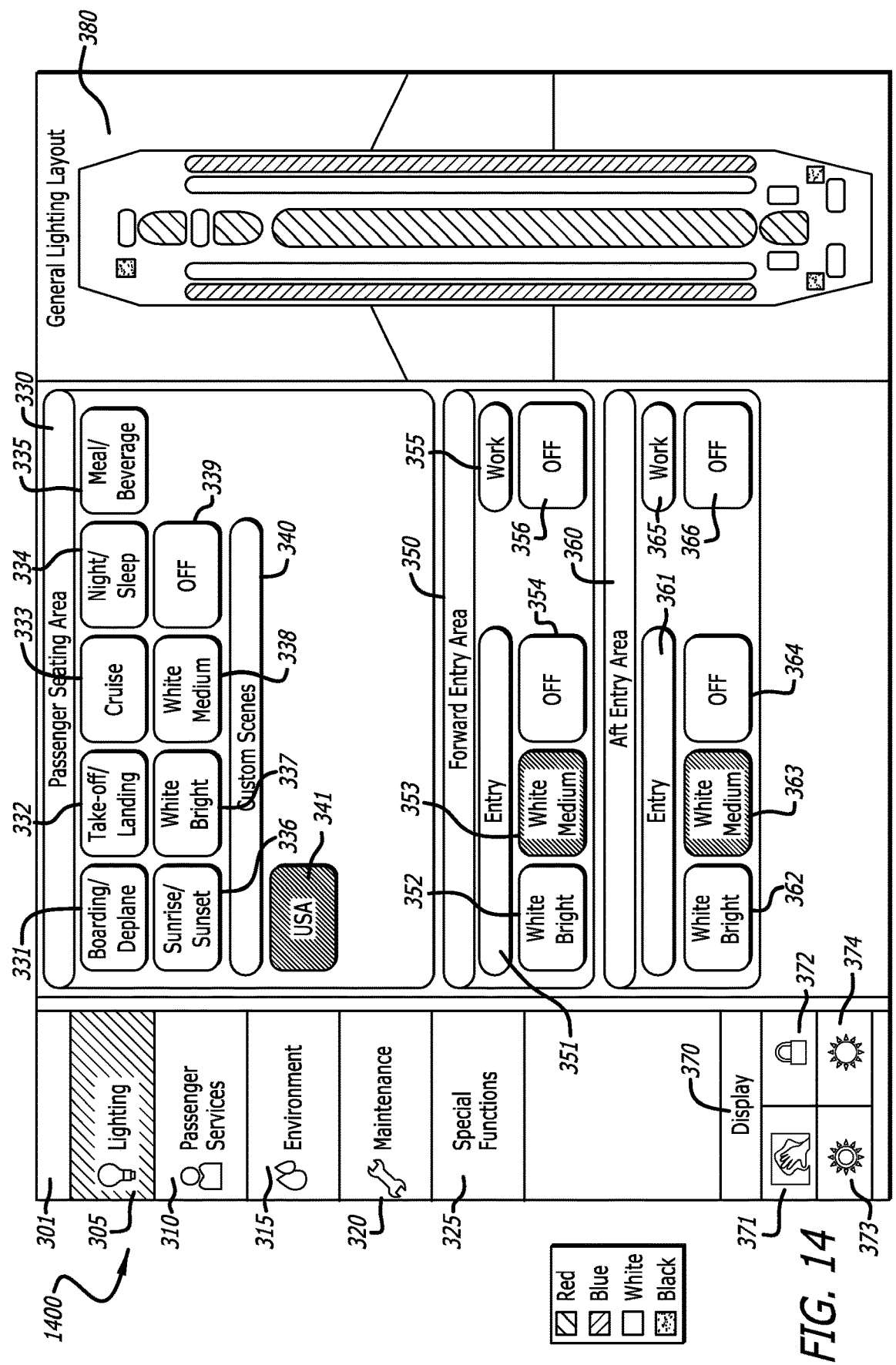
FIG. 14 is a screen shot for the lighting feature category of the disclosed ACP virtual trainer showing the USA custom cabin lighting feature, in accordance with at least one embodiment of the present disclosure.

FIG. 14 is a screen shot 1400 for the lighting feature category of the disclosed ACP virtual trainer showing the USA custom cabin lighting feature 341, in accordance with at least one embodiment of the present disclosure. In this figure, it is shown that the user has selected the lighting feature category 305 as well as the USA feature 341 for the passenger seating area section 330, the white medium selection 353 for the entry feature 351 for the forward entry area section 350, and the white medium button selection 363 for the entry feature 361 for the aft entry area section 360. The general lighting layout section 380 is shown to display the specific lighting configuration, which corresponds to these specific lighting selections, as it would appear in the cabin of the aircraft.

Figure 15:
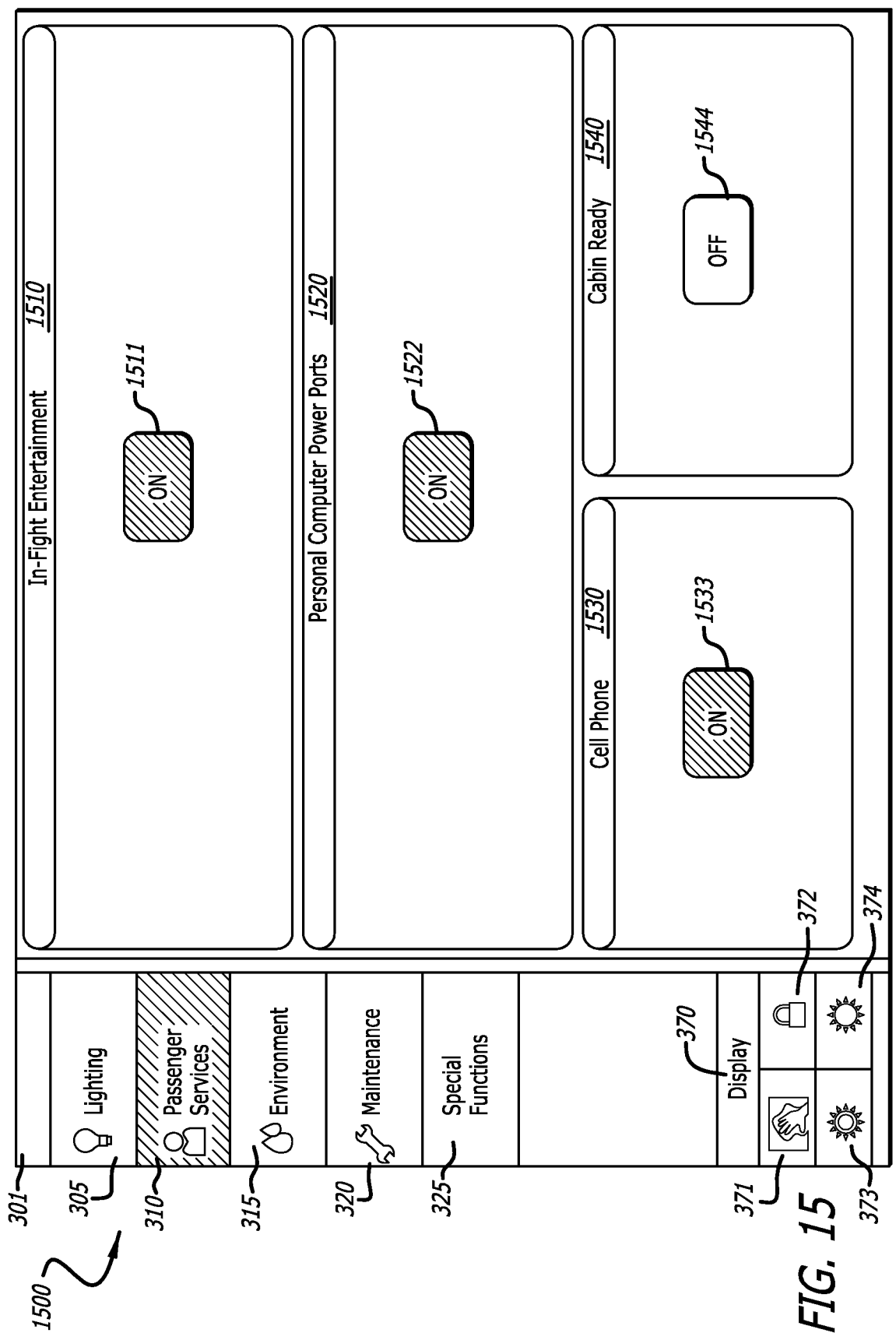
FIG. 15 is a screen shot for the passenger services feature category of the disclosed ACP virtual trainer showing exemplary passenger services features, in accordance with at least one embodiment of the present disclosure.

FIG. 15 is a screen shot 1500 for the passenger services feature category 310 of the disclosed ACP virtual trainer showing exemplary passenger services features, in accordance with at least one embodiment of the present disclosure. In this figure, it is shown that the passenger services feature category 310 has been selected by the user. The screen shot 1500 shows that the passenger services feature category 310 comprises four sections. These four sections are the in-flight entertainment section 1510, the cabin personal computer power ports section 1520, the cabin cell phone section 1530, and the cabin ready section 1540. Each of these sections 1510, 1520, 1530, 1540 is shown to contain an on/off button selection 1511, 1522, 1533, 1544 that can be toggled by the user to turn on power for the feature of that particular section or to shut off power for the feature of that section. In FIG. 15, the buttons 1511, 1522, and 1533 are shown to be selected to be on, and the button 1544 is shown to be selected to be off.

Figure 16:
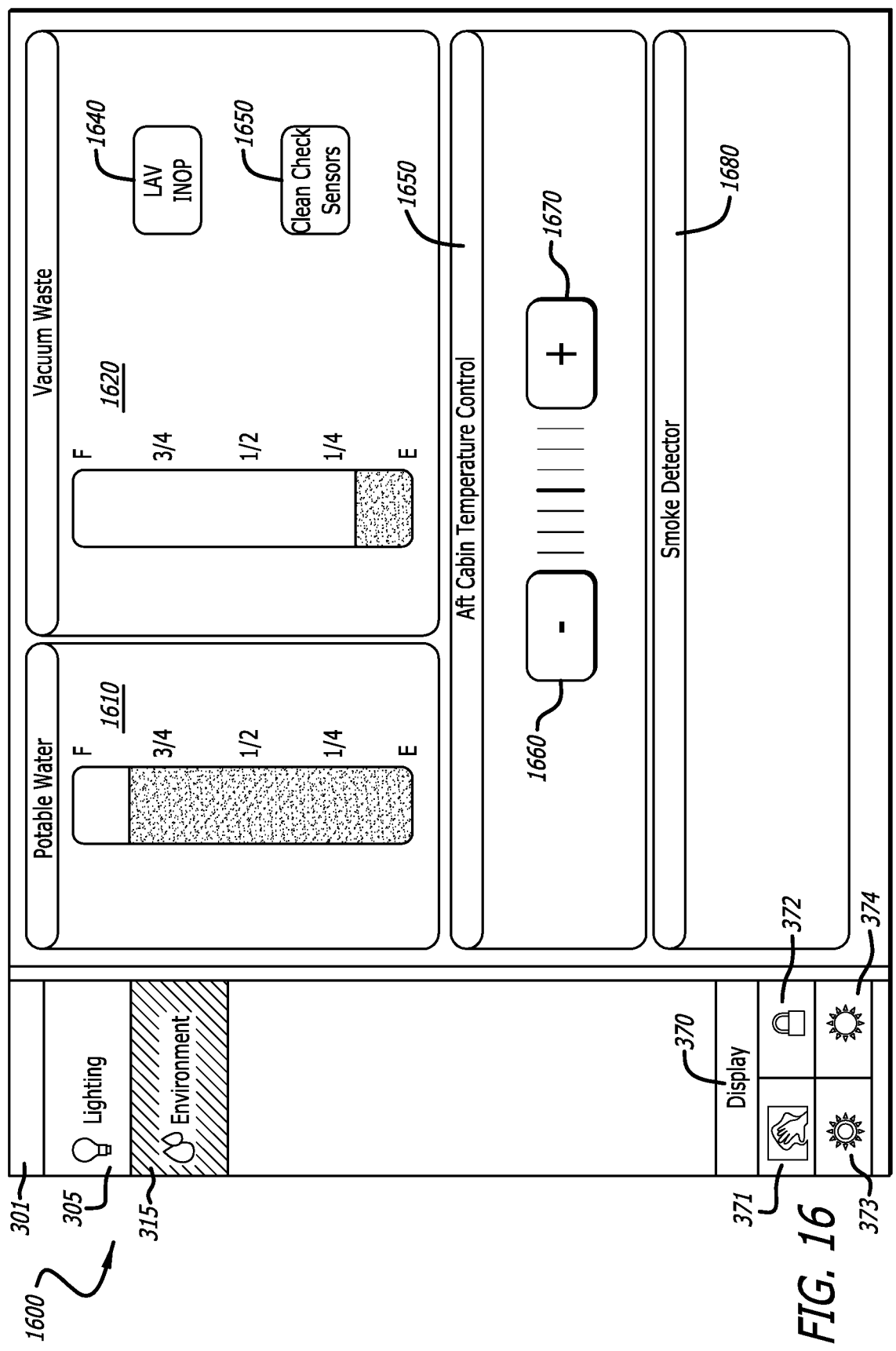
FIG. 16 is a screen shot for the environment feature category of the disclosed ACP virtual trainer showing exemplary aft cabin environment features, in accordance with at least one embodiment of the present disclosure.

FIG. 16 is a screen shot 1600 for the environment feature category 315 of the disclosed ACP virtual trainer showing exemplary aft cabin environment features, in accordance with at least one embodiment of the present disclosure. In this figure, the aft cabin environment features are shown to contain four sections, which are the potable water section 1610, the vacuum waste section 1620, the aft temperature control section 1630, and the smoke detector section 1680. The potable water section 1610 shows a reading of how much potable water is available in the aircraft potable water tank.

The vacuum waste section 1620 shows a reading of how full the vacuum waste tank of the aircraft is. In addition, the vacuum waste section 1620 also has a lavatory inoperable light 1640 that will illuminate if any of the aircraft lavatories are inoperable, and a clean check sensors light 1650 that will illuminate to indicate that the vacuum waste sensors should be cleaned.

The aft cabin temperature control section 1630 contains a minus button 1660 and a plus button 1670 that can be selected by the user to lower the aft cabin temperature or to raise the aft cabin temperature, respectively. The smoke detector section 1680 will display a message if any of the smoke detectors are activated.

Figure 17:
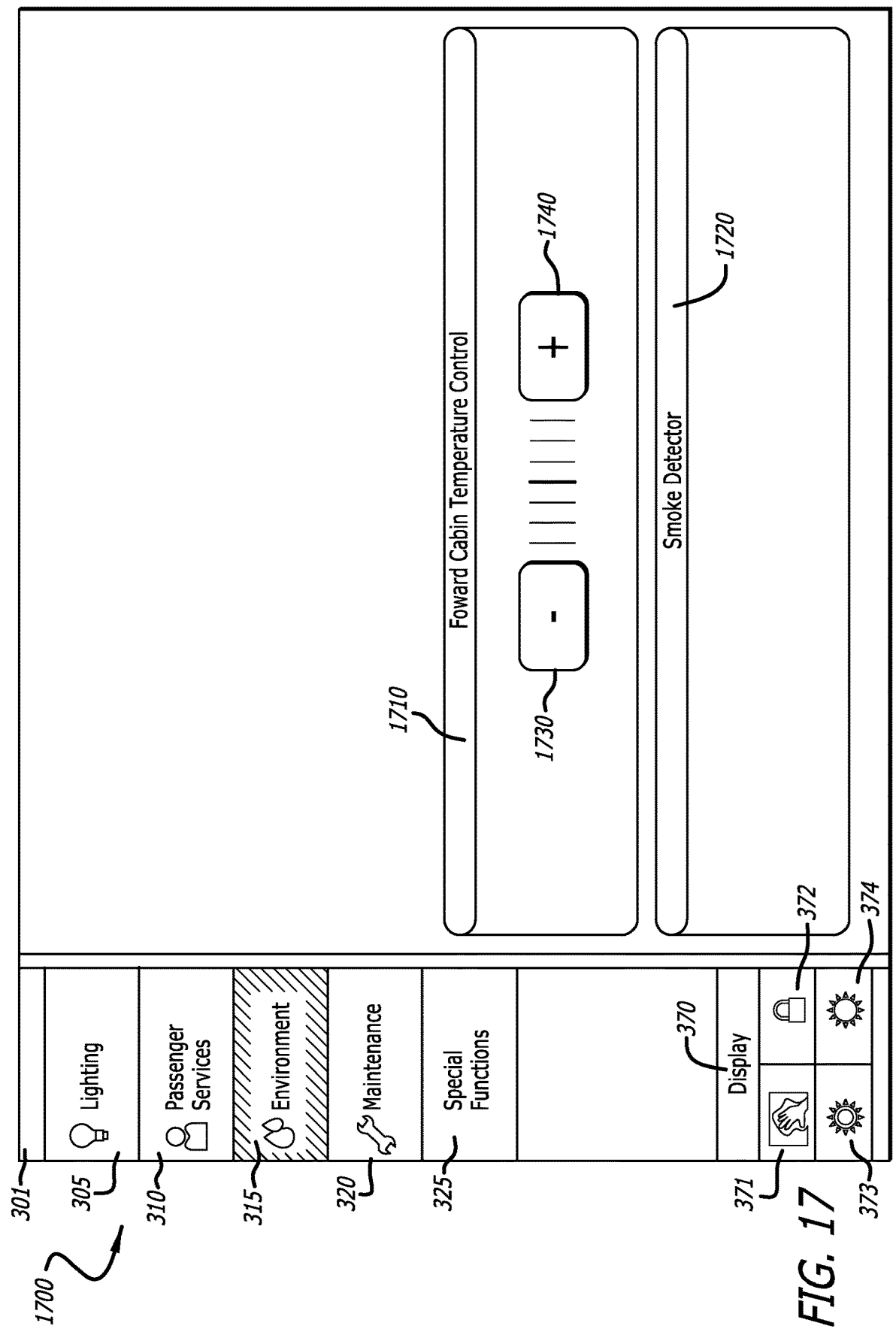
FIG. 17 is a screen shot for the environment feature category of the disclosed ACP virtual trainer showing exemplary forward cabin environment features, in accordance with at least one embodiment of the present disclosure.

FIG. 17 is a screen shot 1700 for the environment feature category 315 of the disclosed ACP virtual trainer showing exemplary forward cabin environment features, in accordance with at least one embodiment of the present disclosure. In this figure, the forward cabin environment features are shown to contain two sections, which are the forward temperature control section 1710 and the smoke detector section 1720. The forward cabin temperature control section 1710 contains a minus button 1730 and a plus button 1740 that can be selected by the user to lower the forward cabin temperature or to raise the aft cabin temperature, respectively. The smoke detector section 1720 will display a message if any of the smoke detectors are activated.

Figure 18:
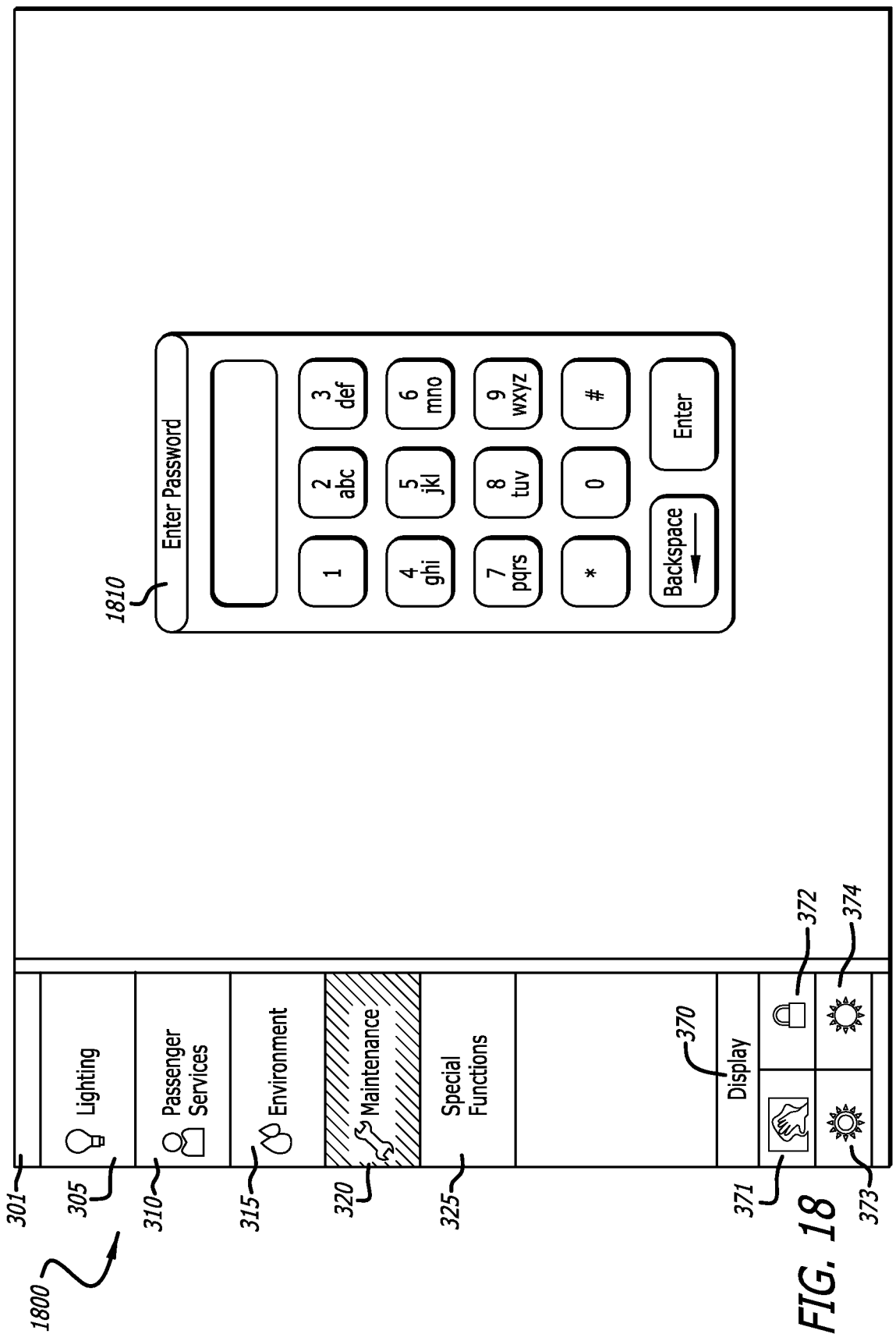
FIG. 18 is a screen shot for the maintenance feature category of the disclosed ACP virtual trainer showing an exemplary maintenance password feature, in accordance with at least one embodiment of the present disclosure.

FIG. 18 is a screen shot 1800 for the maintenance feature category 320 of the disclosed ACP virtual trainer showing an exemplary maintenance password feature, in accordance with at least one embodiment of the present disclosure. In this figure, a password keypad 1810 is shown. When a maintenance worker wants to access the features of the maintenance feature category 320, the maintenance worker will key in his password into the password keypad 1810. Once the password is entered into the password keypad 1810, the maintenance feature category 320 will be unlocked and accessible to the maintenance worker.

Figure 19:
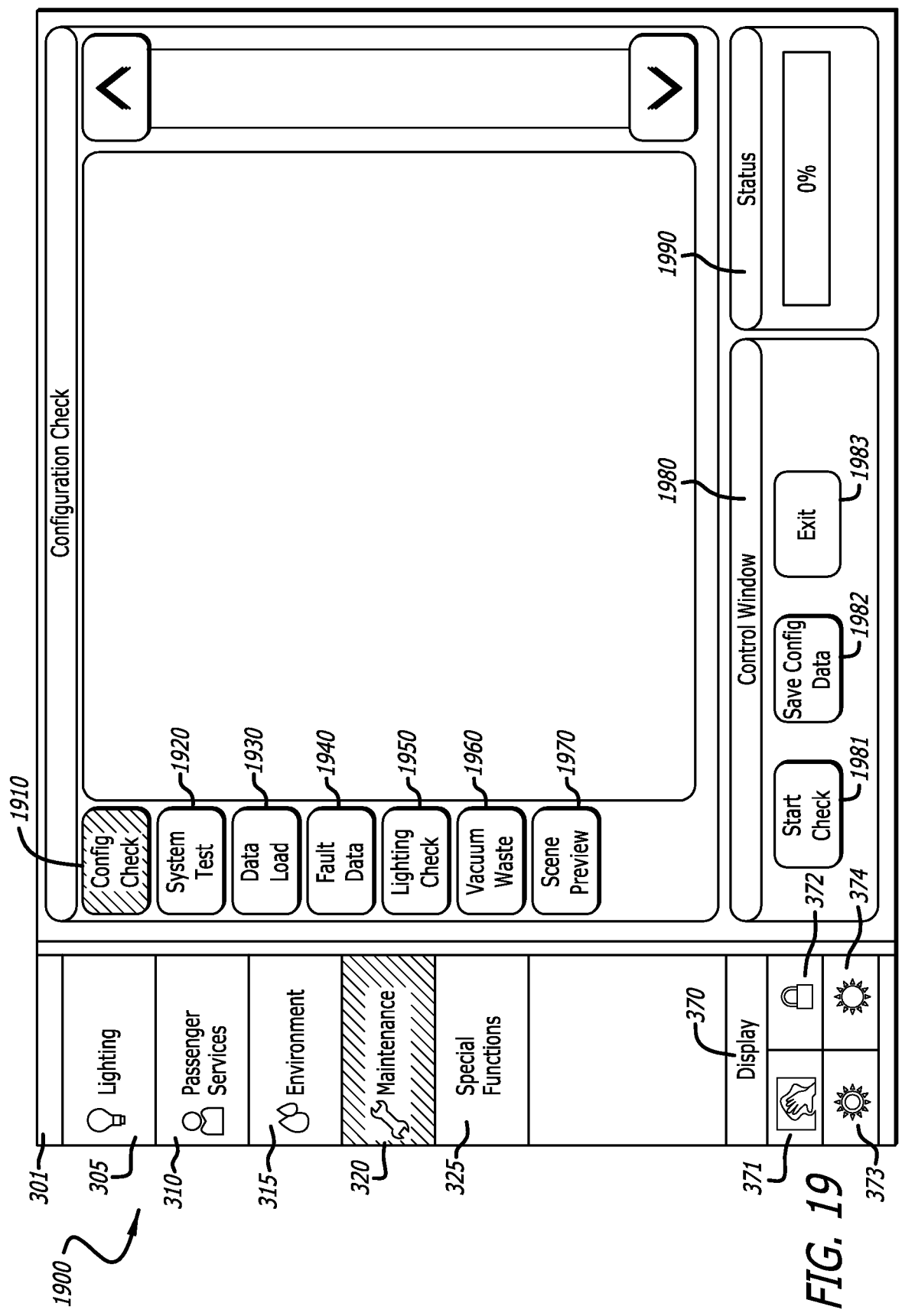
FIG. 19 is a screen shot for the maintenance feature category of the disclosed ACP virtual trainer showing an exemplary configuration check feature, in accordance with at least one embodiment of the present disclosure.

FIG. 19 is a screen shot 1900 for the maintenance feature category 320 of the disclosed ACP virtual trainer showing an exemplary configuration check feature 1910, in accordance with at least one embodiment of the present disclosure. In this figure, it is shown that the maintenance feature category 320 has been selected (and, optionally, unlocked) by the user. The screen shot 1900 shows that the maintenance feature category 320 comprises seven features. These seven features are the configuration check feature 1910, the system test feature 1920, the data load feature 1930, the fault data feature 1940, the lighting check feature 1950, the vacuum waste feature 1960, and the scene preview feature 1970.

Also in this figure, it is shown that the configuration check feature 1910 has been selected by the user. When the configuration check feature 1910 is selected, a control window section 1980 and a status section 1990 will appear. The status section 1990 has a read out that indicates the amount of progress of the selected task. The control window section 1980 contains a start check button 1981, a save configuration data button 1982, and an exit button 1983. To begin the configuration check, the user is to select the start check button 1981 in the control window section 1980. To save the configuration data, the user is to select the save configuration data button 1982.

Figure 20:
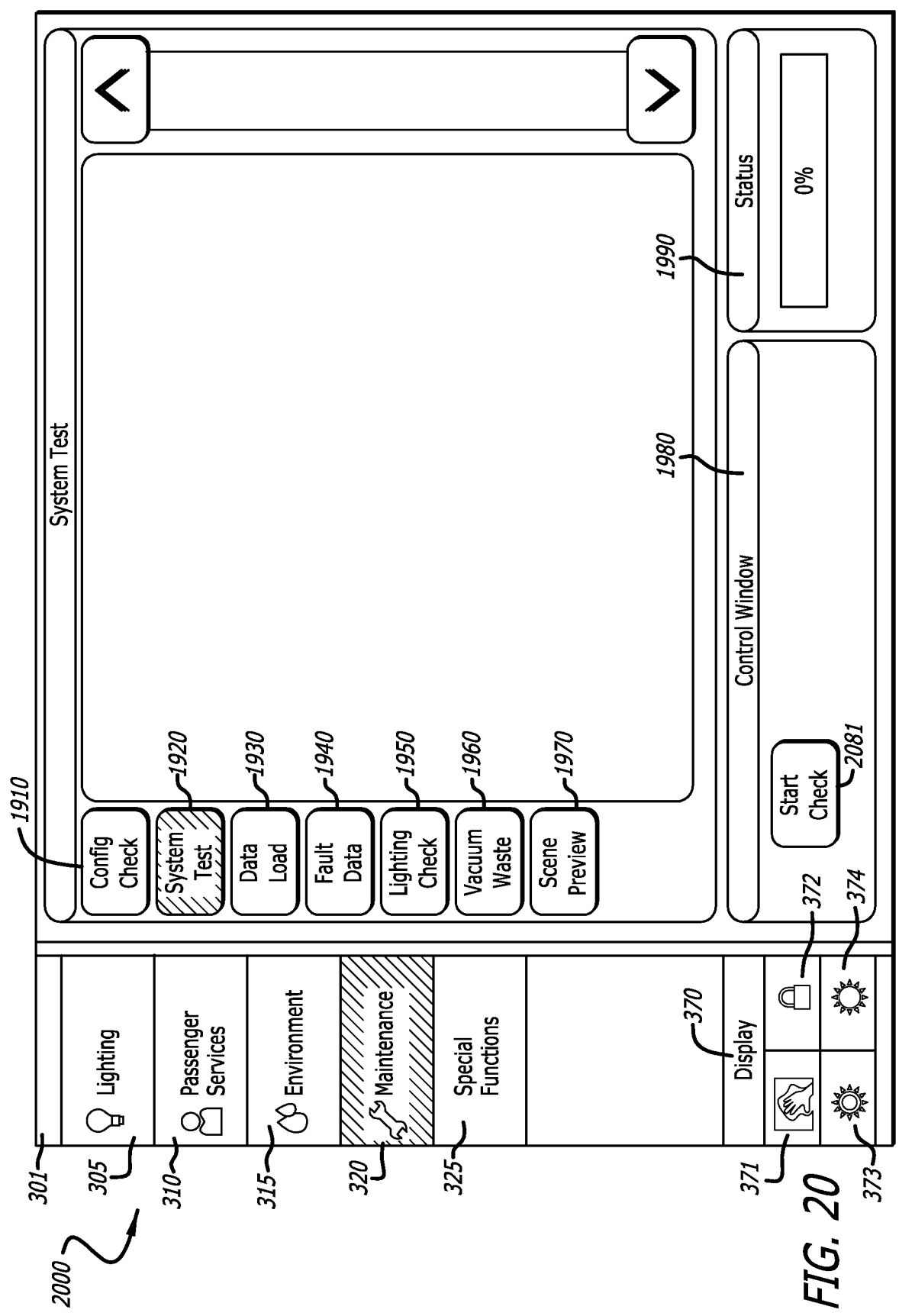
FIG. 20 is a screen shot for the maintenance feature category of the disclosed ACP virtual trainer showing an exemplary system test feature, in accordance with at least one embodiment of the present disclosure.

FIG. 20 is a screen shot 2000 for the maintenance feature category 320 of the disclosed ACP virtual trainer showing an exemplary system test feature 1920, in accordance with at least one embodiment of the present disclosure. It is shown in this figure that the system test feature 1920 has been selected by the user. When the system test feature 1920 is selected, the control window section 1980 and the status section 1990 will appear. The control window section 1980 contains a start test button 2081. To begin the system test, the user is to select the start test button 2018 in the control window section 1980.

Figure 21:
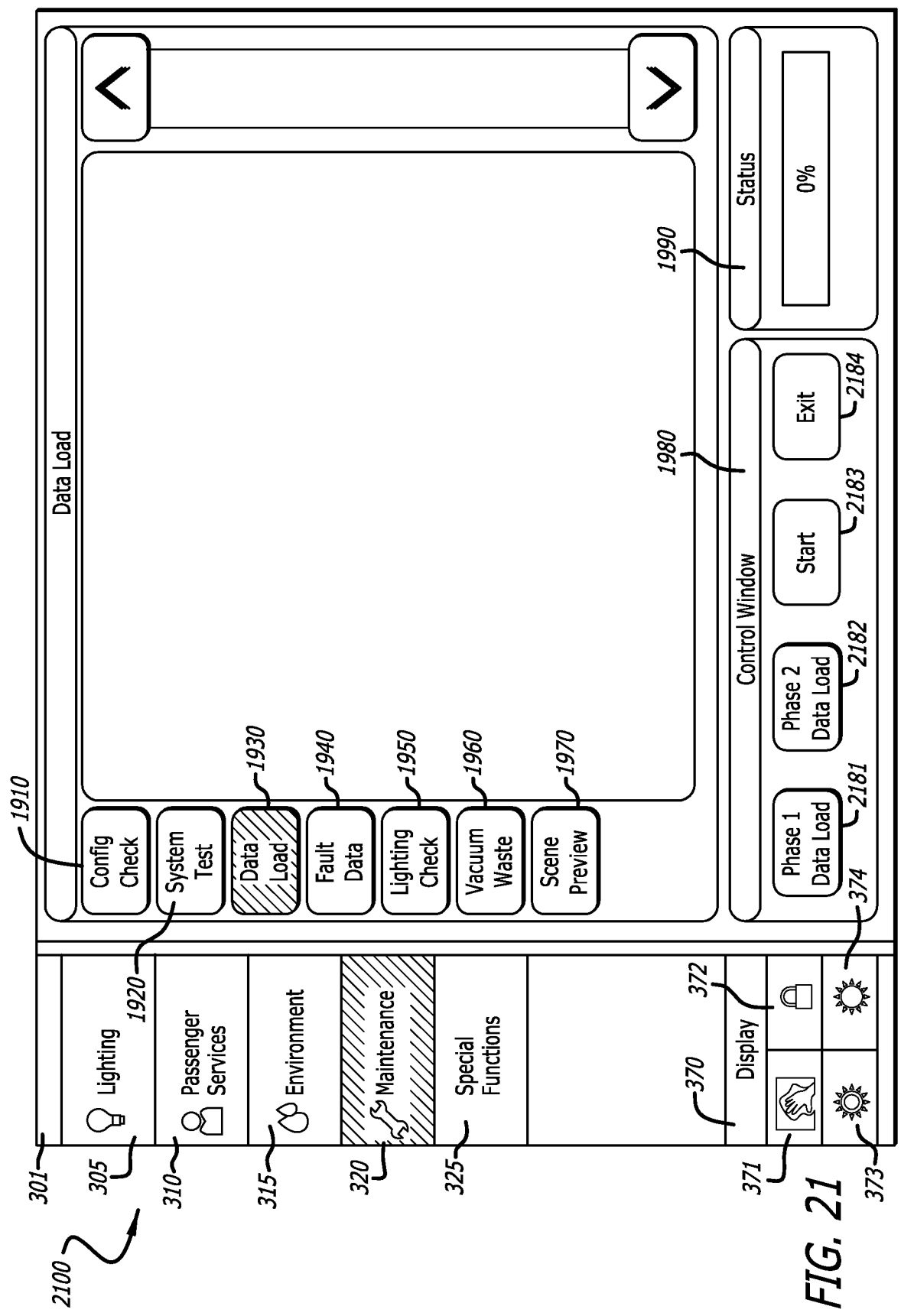
FIG. 21 is a screen shot for the maintenance feature category of the disclosed ACP virtual trainer showing an exemplary data load feature, in accordance with at least one embodiment of the present disclosure.

FIG. 21 is a screen shot 2100 for the maintenance feature category 320 of the disclosed ACP virtual trainer showing an exemplary data load feature 1930, in accordance with at least one embodiment of the present disclosure. It is shown in this figure that the data load feature 1930 has been selected by the user. When the data load feature 1930 is selected, the control window section 1980 and the status section 1990 will appear. The control window section 1980 contains a phase 1 data load button 2181, a phase 2 data load button 2182, a start button 2183, and an exit button 2184. To simulate an ACP data load, the user is to insert a disk into the drive, and press the phase 1 data load button 2181 to load the data. Then, the user is to press the phase 2 data load button 2182 to continue the data load.

Figure 22:
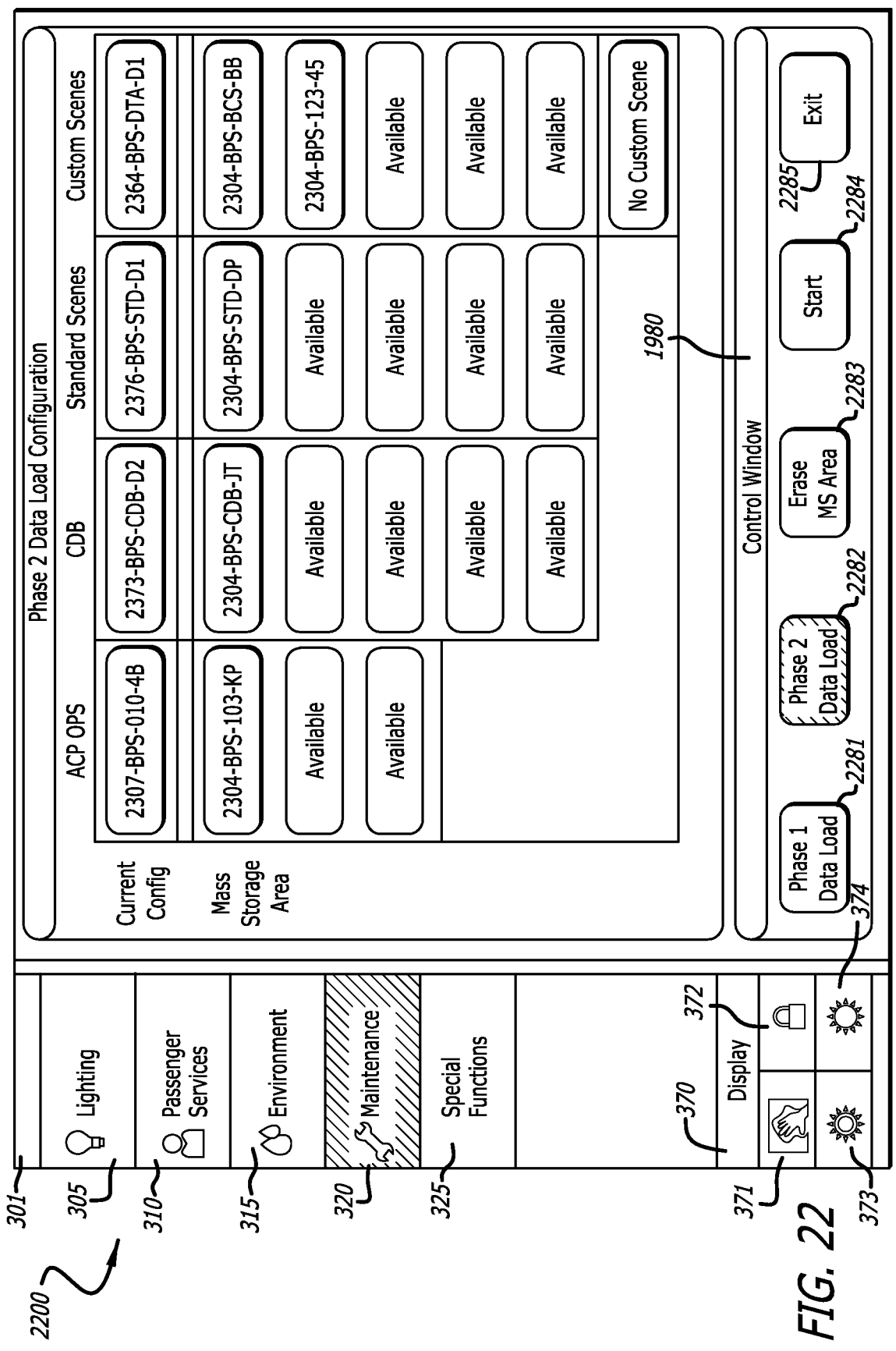
FIG. 22 is a screen shot for the maintenance feature category of the disclosed ACP virtual trainer showing exemplary data load configuration selections made for the data load feature, in accordance with at least one embodiment of the present disclosure.

FIG. 22 is a screen shot 2200 for the maintenance feature category 320 of the disclosed ACP virtual trainer showing exemplary data load configuration selections made for the data load feature 1930, in accordance with at least one embodiment of the present disclosure. In this figure, it is shown that the data load feature 1930 has been selected by the user. The control window section 1980 contains a phase 1 data load button 2281, a phase 2 data load button 2282, an erase MS area button 2283, a start button 2284, and an exit button 2285; and the status window section 1990 disappears. The main area of this screen shot 2200 shows various different sets of data, which is each labeled with a specific code (e.g., 2307-BPS-010-4B), that has been loaded into the ACP. When the user has pressed the start button 2284, the selected (highlighted) data is loaded onto the connected system(s). When the user has selected the erase MS area button 2283, the data in the mass storage area is erased.

Figure 23:
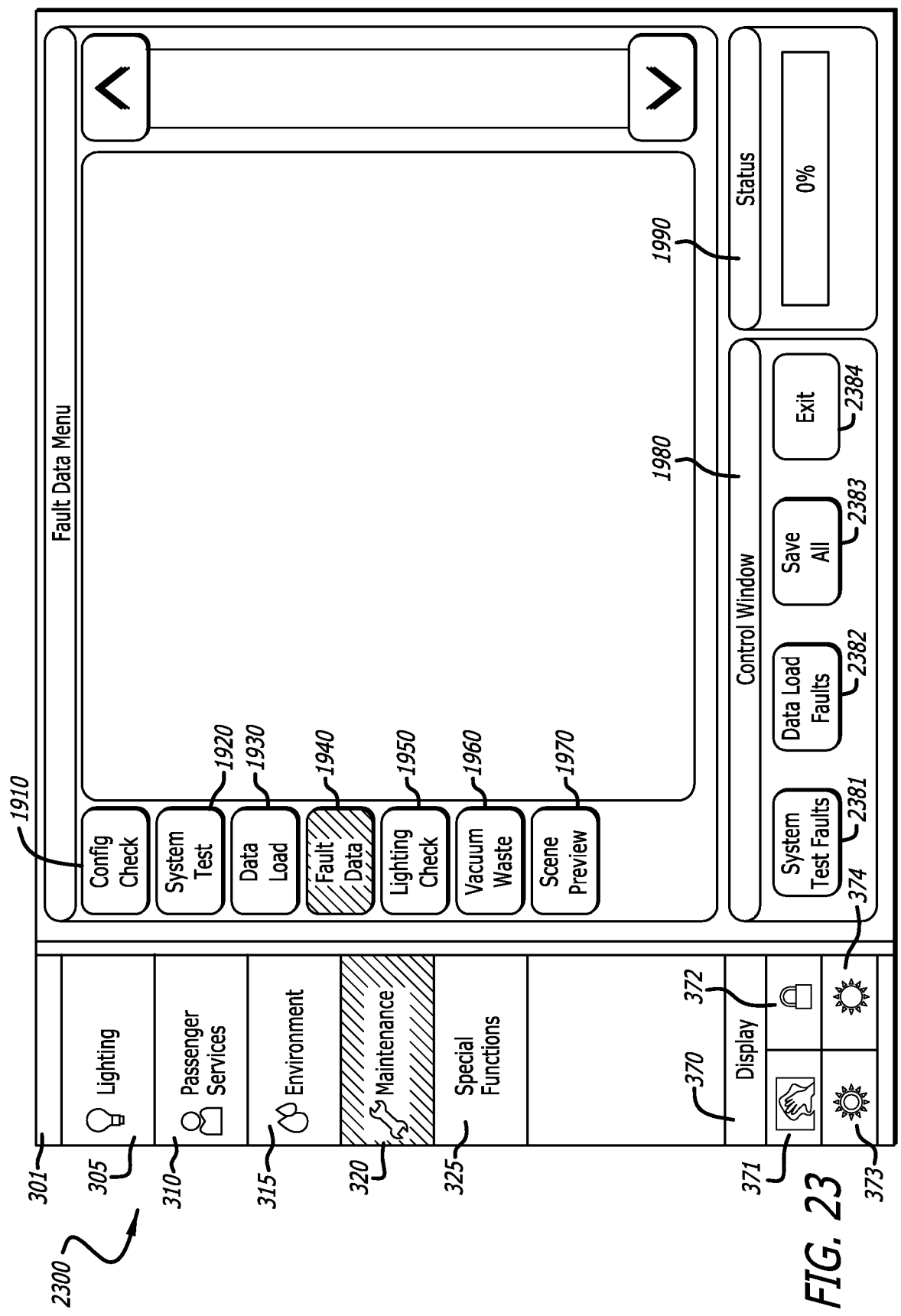
FIG. 23 is a screen shot for the maintenance feature category of the disclosed ACP virtual trainer showing an exemplary fault data feature, in accordance with at least one embodiment of the present disclosure.

FIG. 23 is a screen shot 2300 for the maintenance feature category 320 of the disclosed ACP virtual trainer showing an exemplary fault data feature 1940, in accordance with at least one embodiment of the present disclosure. It is shown in this figure that the fault data feature 1940 has been selected by the user. When the fault data feature 1940 is selected, the control window section 1980 and the status section 1990 will appear. The control window section 1980 contains a system test faults button 2181, a data load faults button 2382, a save all button 2382, and an exit button 2384. To view the system faults, the user is to press the system test faults button 2381 in the control window section 1980. To view the data load faults, the user is to press the data load faults button 2382. The save the system faults, configuration data, and lighting data, the user is to load a disk and press the save all button 2382 in the control window section 1980.

Figure 24:
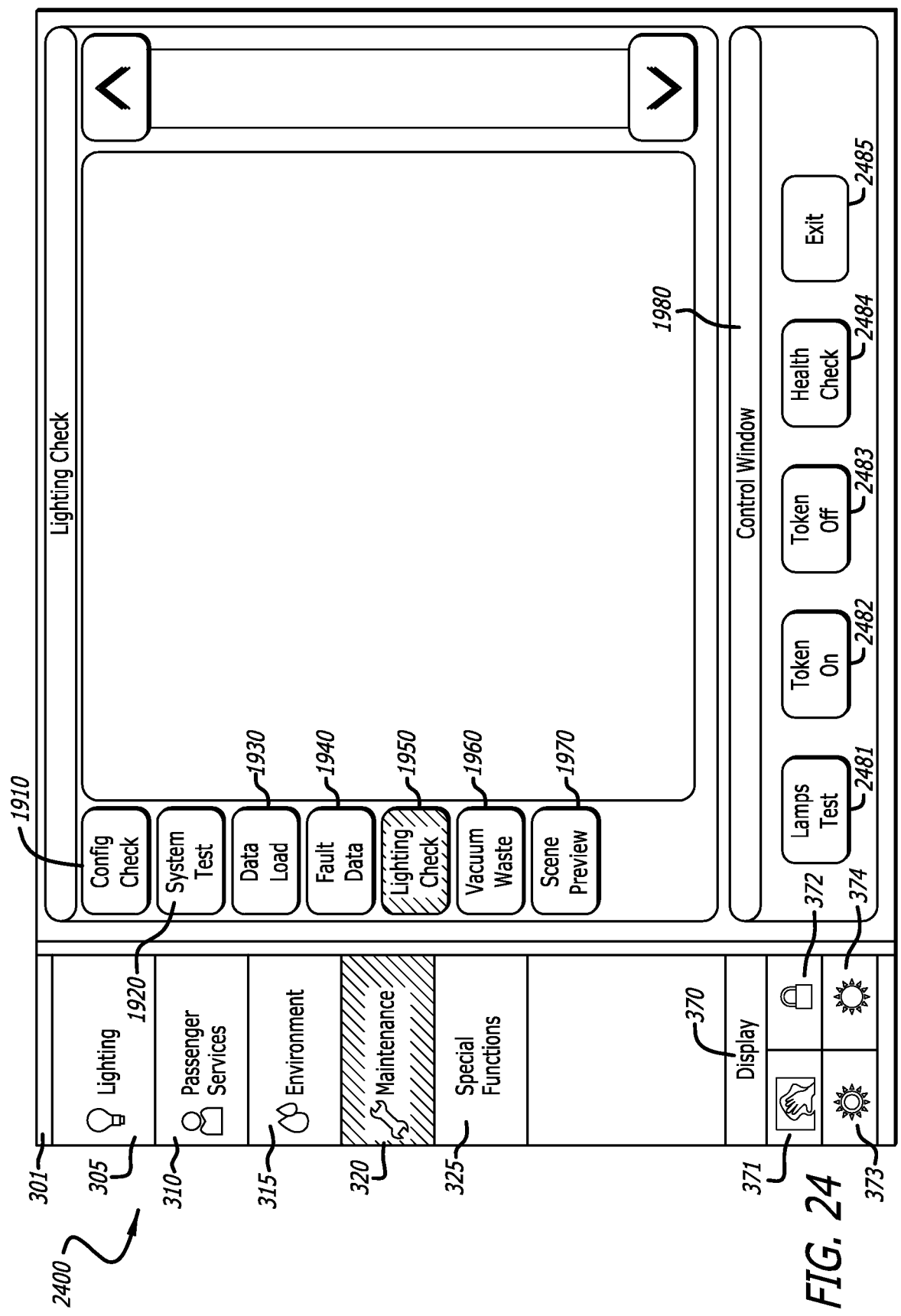
FIG. 24 is a screen shot for the maintenance feature category of the disclosed ACP virtual trainer showing an exemplary light check feature, in accordance with at least one embodiment of the present disclosure.

FIG. 24 is a screen shot 2400 for the maintenance feature category 320 of the disclosed ACP virtual trainer showing an exemplary light check feature 1950, in accordance with at least one embodiment of the present disclosure. It is shown in this figure that the light check feature 1950 has been selected by the user. When the light check feature 1950 is selected, the control window section 1980 will appear. The control window section 1980 contains a lamps test button 2481, a token on button 2482, a token off button 2483, a health check button 2484, and an exit button 2485. To start a lamps test, the user is to press the lamps test button 2481 in the control window section 1980. To start a lighting token check, the user is to press the token on button 2482; and to stop the lighting token check, the user is to press the token off button 2483. To start a general health check of the lamps, the user is to press the health check button 2484 in the control window section 1980.

Figure 25:
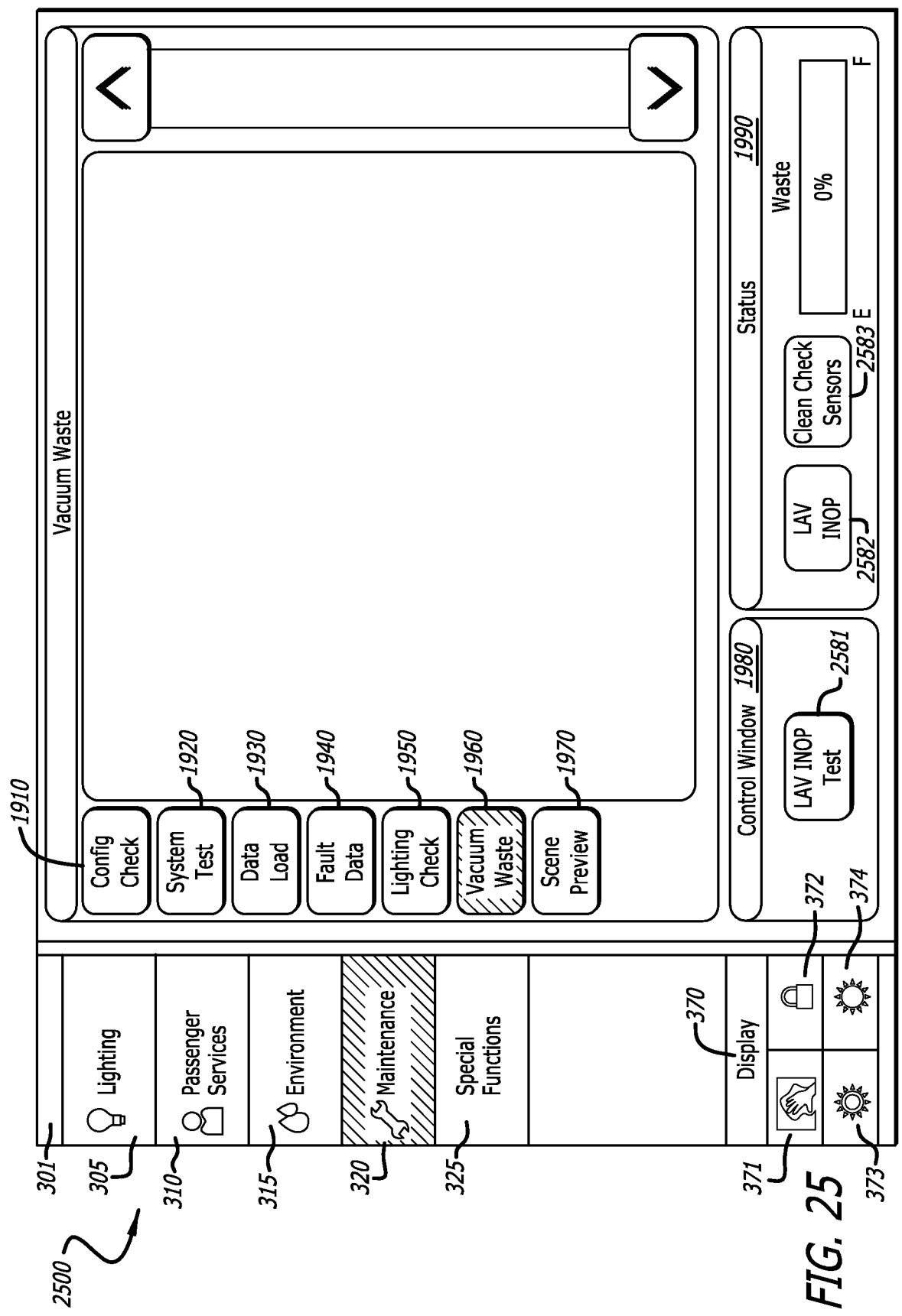
FIG. 25 is a screen shot for the maintenance feature category of the disclosed ACP virtual trainer showing an exemplary vacuum waste feature, in accordance with at least one embodiment of the present disclosure.

FIG. 25 is a screen shot 2500 for the maintenance feature category 320 of the disclosed ACP virtual trainer showing an exemplary vacuum waste feature 1960, in accordance with at least one embodiment of the present disclosure. It is shown in this figure that the vacuum waste feature 1960 has been selected by the user. When the vacuum waste feature 1960 is selected, the control window section 1980 and the status window 1990 will appear. The control window section 1980 contains a lavatory inoperable test button 2581. In addition to the status section 1990 containing a progress read out, the status section 1990 also contains a lavatory inoperable indicator 2582 and a clean check sensors indicator 2583. To begin the lavatory test, the user is to press the lavatory inoperable test button 2581 in the control window section 1980. If the lavatory is inoperable, the lavatory inoperable indicator 2582 will illuminate. And, if the vacuum waste sensors need to be cleaned, the clean check sensors indicator 2583 will illuminate.

FIG. 26 is a screen shot 2600 for the maintenance feature category 320 of the disclosed ACP virtual trainer showing exemplary scene preview selections made for the scene preview feature 1970, in accordance with at least one embodiment of the present disclosure. In this figure, it is shown that the scene preview feature 1970 has been selected by the user. This screen shot 2600 shows the various lighting settings (including different colors and intensities) that may be selected by the user for the various different aircraft cabin lights.

Figure 27:
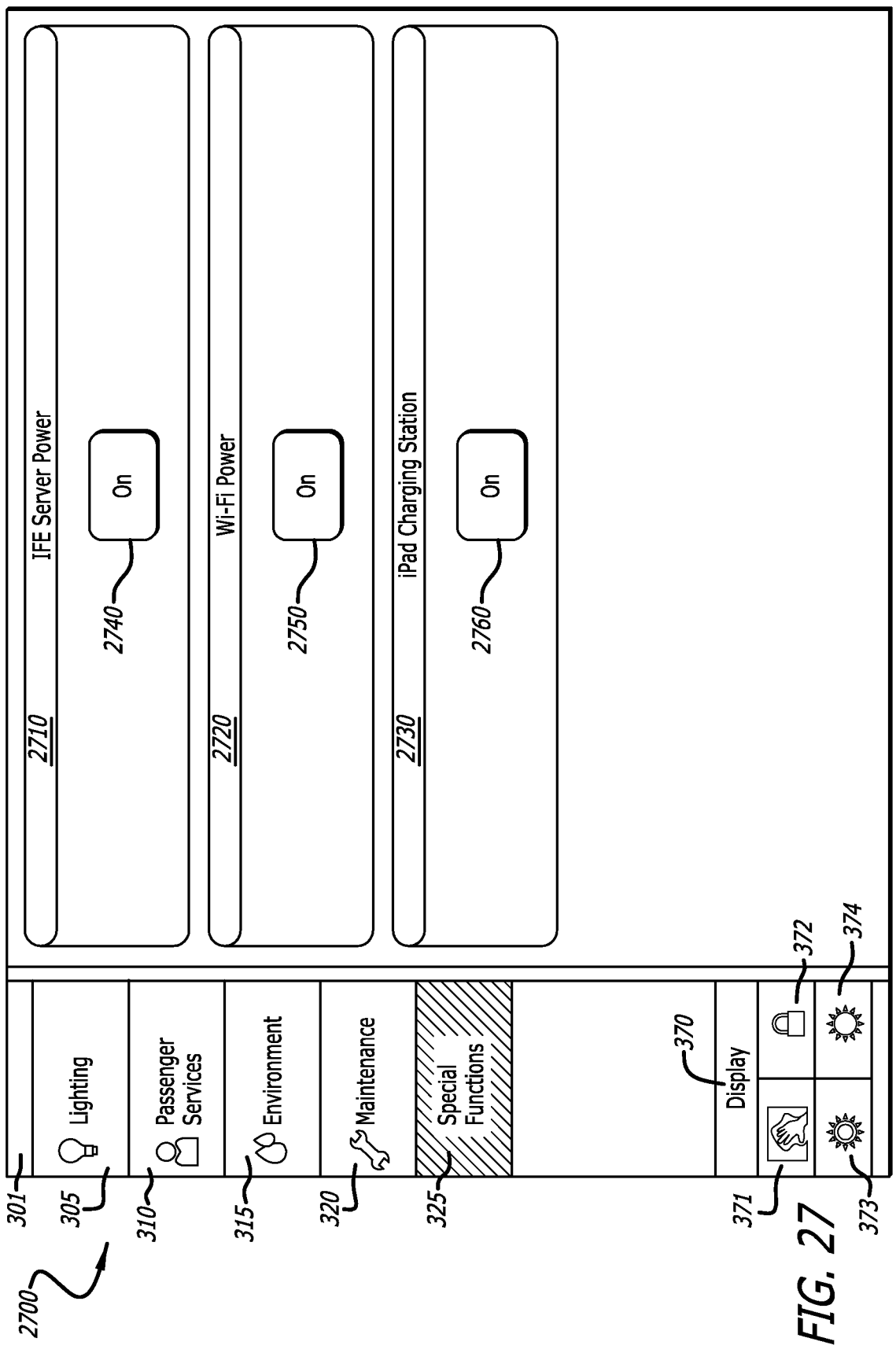
FIG. 27 is a screen shot for the special functions feature category of the disclosed ACP virtual trainer showing exemplary special functions features, in accordance with at least one embodiment of the present disclosure.

FIG. 27 is a screen shot 2700 for the special functions feature category 325 of the disclosed ACP virtual trainer showing exemplary special functions features, in accordance with at least one embodiment of the present disclosure. In this figure, it is shown that the special functions feature category 325 has been selected by the user. The screen shot 2700 shows that the example special functions feature category 325 comprises three sections. The three sections are the in-flight entertainment power section 2710, the cabin Wi-Fi power section 2720, and the cabin iPad charging station section 2730. Each of these sections 2710, 2720, 2730 is shown to contain an on/off button selection 2740, 2750, 2760 that can be toggled by the user to turn on power for the feature of that particular section or to shut off power for the feature of that section. In this figure, the buttons 2740 and 2750 are shown to be selected to be on, and the button 2760 is shown to be selected to be off.

FIG. 28 is a screen shot 2800 from the disclosed ACP virtual trainer showing a clean screen now image, in accordance with at least one embodiment of the present disclosure. When a user selects the clean screen button 371 (refer to FIG. 3), this clean screen now image will be displayed on the screen, and the touch sensitivity of the touch screen will be disengaged for a short period of time to allow for the user to clean the touch screen. When the period of time has elapsed, the sensitivity of the touch screen will be re-established, and this clean screen now image will disappear.

As used herein, the phrase "at least one of", when used with a list of items, means different combinations of one or more of the listed items may be used and only one of the items in the list may be needed. The item may be a particular object, thing, or category. In other words, "at least one of" means any combination of items or number of items may be used from the list, but not all of the items in the list may be required. For example, "at least one of item A, item B, and item C" may mean item A; item A and item B; item B; item A, item B, and item C; or item B and item C. In some cases, "at least one of item A, item B, and item C" may mean, for example, without limitation, two of item A, one of item B, and ten of item C; four of item B and seven of item C; or some other suitable combination.

Although certain illustrative embodiments and methods have been disclosed herein, it can be apparent from the foregoing disclosure to those skilled in the art that variations and modifications of such embodiments and methods can be made without departing from the true spirit and scope of the art disclosed. Many other examples of the art disclosed exist, each differing from others in matters of detail only. Accordingly, it is intended that the art disclosed shall be limited only to the extent required by the appended claims and the rules and principles of applicable law.

We claim:

1. A system for an attendant control panel (ACP) virtual trainer for an ACP for an aircraft, the system comprising:
the aircraft comprising the ACP coupled to an onboard network server;
the onboard network server comprising at least one processor operable to run ACP operation software and the ACP virtual trainer; and
the ACP comprising a screen and operable to display on the screen both control screens and simulation screens, and wherein the ACP is located within a cabin of the aircraft,
wherein when the at least one processor of the onboard network server runs the ACP operation software, the ACP is operable to display, on the screen of the ACP, the control screens that show available selections relating to different functions for the cabin that may be chosen by a user to control the different functions such that when a user chooses one of the available selections shown on one of the control screens, the function related to the selection that is chosen is physically executed within the cabin of the aircraft, and wherein the different functions correspond to different physical characteristics of the cabin of the aircraft, and
wherein when the at least one processor of the onboard network server runs the ACP virtual trainer, the ACP is operable to display, on the screen of the ACP, the simulation screens that simulate the functionality of the ACP by showing the available selections relating to the different functions for the cabin, as shown on the control screens for the ACP, thereby providing training for using the ACP such that when the user chooses one of the available selections shown on one of the simulation screens, the function related to the selection that is chosen is not physically executed within the cabin of the aircraft, but rather a visual example of the function related to the selection that is chosen is displayed on the screen of the ACP, and
wherein the available selections comprise at least one of a lighting feature category, a passenger services feature category, or an environment feature category.

2. The system of claim 1, wherein the aircraft is one of an airplane, a helicopter, or a space plane.

3. The system of claim 1, wherein the system further comprises a device, which is one of mobile or stationary.

4. The system of claim 3, wherein the device is one of a tablet device, a laptop computer, a desktop computer, or a smart phone.

5. The system of claim 4, wherein a screen of the device is a touch screen.

6. The system of claim 1, wherein the screen of the ACP is a touch screen.

7. The system of claim 1, wherein features for the lighting feature category are at least one of boarding/deplane, take-off/landing, cruise, night/sleep, meal/beverage, sunrise/sunset, white bright, white medium, off, or custom scenes.

8. The system of claim 1, wherein features for the passenger services feature category are at least one of in-flight entertainment, personal computer power ports, cabin cell phones, or cabin ready.

9. The system of claim 1, wherein features for the environment feature category are at least one of potable water quantities, vacuum waste quantities, aft cabin temperature control, aft cabin smoke detectors, forward cabin temperature control, or forward cabin smoke detectors.

10. A method for an attendant control panel (ACP) virtual trainer for an ACP for an aircraft, the method comprising:

when at least one processor of an onboard network server runs ACP operation software, displaying, on a screen of the ACP, control screens that show available selections relating to different functions for a cabin of the aircraft that may be chosen by a user to control the different functions such that when a user chooses one of the available selections shown on one of the control screens, the function related to the selection that is chosen is physically executed within the cabin of the aircraft, and wherein the different functions correspond to different physical characteristics of the cabin of the aircraft, and when the at least one processor of the onboard network server runs the ACP virtual trainer, displaying, on the screen of the ACP, simulation screens that simulate the functionality of the ACP by showing the available selections relating to the different functions for the cabin, as shown on the control screens for the ACP, thereby providing training for using the ACP such that when the user chooses one of the available selections shown on one of the simulation screens, the function related to the selection that is chosen is not physically executed within the cabin of the aircraft, but rather a visual example of the function related to the selection that is chosen is displayed on the screen of the ACP, wherein the aircraft comprises the ACP coupled to the onboard network server, and wherein the available selections comprise at least one of a lighting feature category, a passenger services feature category, or an environment feature category.

11. The method of claim 10, wherein the method further comprises loading the ACP virtual trainer onto a device.

12. The method of claim 11, wherein the method further comprises: recognizing, by the ACP virtual trainer loaded onto the device, a type of the aircraft the device is located within.

13. The method of claim 11, wherein the method further comprises opening the ACP virtual trainer on the device, after an activation code is entered onto the device.

14. The method of claim 13, wherein the activation code is provided by a manufacturer of the aircraft.

15. The system of claim 1, wherein when at least one of the available selections on the simulation screens is chosen by the user, the ACP is operable to display, on the screen of the ACP, a configuration screen that shows a visual example of how a configuration related to the at least one available selection chosen by the user will appear within the cabin of the aircraft.

16. The system of claim 3, wherein the device is operable to have the ACP virtual trainer loaded onto the device.

17. The system of claim 3, wherein the device comprises at least one processor operable to run the ACP virtual trainer.

18. The system of claim 17, wherein when the at least one processor of the device runs the ACP virtual trainer, the device is operable to display, on a screen of the device, the simulation screens that simulate the functionality of the ACP by showing the available selections relating to the different functions for the cabin, as shown on the control screens for the ACP, thereby providing training for using the ACP.

19. The method of claim 10, wherein features for the lighting feature category are at least one of boarding/deplane, take-off/landing, cruise, night/sleep, meal/beverage, sunrise/sunset, white bright, white medium, off, or custom scenes.

20. The method of claim 10, wherein features for the passenger services feature category are at least one of in-flight entertainment, personal computer power ports, cabin cell phones, or cabin ready.

* * * * *